(12) United States Patent
Conn et al.

(10) Patent No.: US 11,091,280 B1
(45) Date of Patent: Aug. 17, 2021

(54) MODELLING AND ANALYZING INTER-SATELLITE RELATIVE MOTION

(71) Applicant: United States of America as Represented by the Administrator of the NASA, Washington, DC (US)

(72) Inventors: Tracie Renea Conn, Detroit, MI (US); Laura Plice, Albuquerque, NM (US)

(73) Assignee: United States of America as Represented by the Administrator of NASA, Washington, DC (US)

(*) Notice: Subject to any disclaimer, the term of this patent is extended or adjusted under 35 U.S.C. 154(b) by 0 days.

(21) Appl. No.: 16/000,759

(22) Filed: Jun. 5, 2018

(51) Int. Cl.
*B64G 7/00* (2006.01)
*B64G 3/00* (2006.01)

(52) U.S. Cl.
CPC ............ *B64G 7/00* (2013.01); *B64G 3/00* (2013.01)

(58) Field of Classification Search
CPC ...................... B64G 7/00; B64G 3/00
See application file for complete search history.

(56) References Cited

U.S. PATENT DOCUMENTS

| | | | | |
|---|---|---|---|---|
| 4,977,579 A * | 12/1990 | Bateman | ........... | H04B 17/20 370/242 |
| 5,359,545 A * | 10/1994 | Ott | ........... | G06F 11/322 703/13 |
| 5,392,450 A * | 2/1995 | Nossen | ........... | H04B 7/2123 342/352 |
| 2004/0192197 A1* | 9/2004 | Capots | ........... | H04B 7/195 455/12.1 |
| 2007/0162410 A1* | 7/2007 | Hinchey | ........... | G06N 5/04 706/48 |
| 2007/0208492 A1* | 9/2007 | Downs | ........... | G08G 1/0104 701/117 |
| 2010/0265149 A1* | 10/2010 | Omori | ........... | G01S 3/42 343/766 |
| 2014/0077036 A1* | 3/2014 | Healy | ........... | B64G 1/24 244/158.8 |
| 2016/0264266 A1* | 9/2016 | Stone | ........... | B64G 1/62 |
| 2017/0137151 A1* | 5/2017 | Lui | ........... | B64G 1/244 |
| 2018/0101169 A1* | 4/2018 | Applewhite | ........... | B64F 1/04 |
| 2018/0106898 A1* | 4/2018 | Baskaran | ........... | G01S 7/411 |
| 2018/0284735 A1* | 10/2018 | Cella | ........... | G05B 23/024 |
| 2019/0074893 A1* | 3/2019 | Kaen | ........... | H04B 7/18521 |
| 2019/0092498 A1* | 3/2019 | Siquier | ........... | B64G 7/00 |
| 2019/0210746 A1* | 7/2019 | Feconda | ........... | G01S 1/042 |

OTHER PUBLICATIONS

Conn, Tracie, et al., "Operating Small Sat Swarms as a Single Entity: Introducing SODA", NASA Ames Research Center, SSC17-V-06, 31st Annual AIAA/USU Conference on Small Satellites, Logan, UT, Aug. 7-10, 2017, 1-9.

Dono, Andres, et al., "Propulsion Trade Studies for Spacecraft Swarm Mission Design", NASA Ames Research Center, 2018 IEEE Aerospace Conference Proceedings, Mar. 3-10, 2018, 1-12.

* cited by examiner

*Primary Examiner* — Behrang Badii
*Assistant Examiner* — Daniel L Greene
(74) *Attorney, Agent, or Firm* — Rhys W. Cheung; Robert M. Padilla; Helen M. Galus

(57) ABSTRACT

An embodiment of the present invention is a system (and concomitant methods and computer software embodied in non-transitory computer readable media) providing formations of satellites and a method of modeling and analyzing inter-satellite relative motion of more than one satellites. These extensions include factoring in spacecraft flight dynamics for achieving real-life and/or simulated objectives.

12 Claims, 13 Drawing Sheets

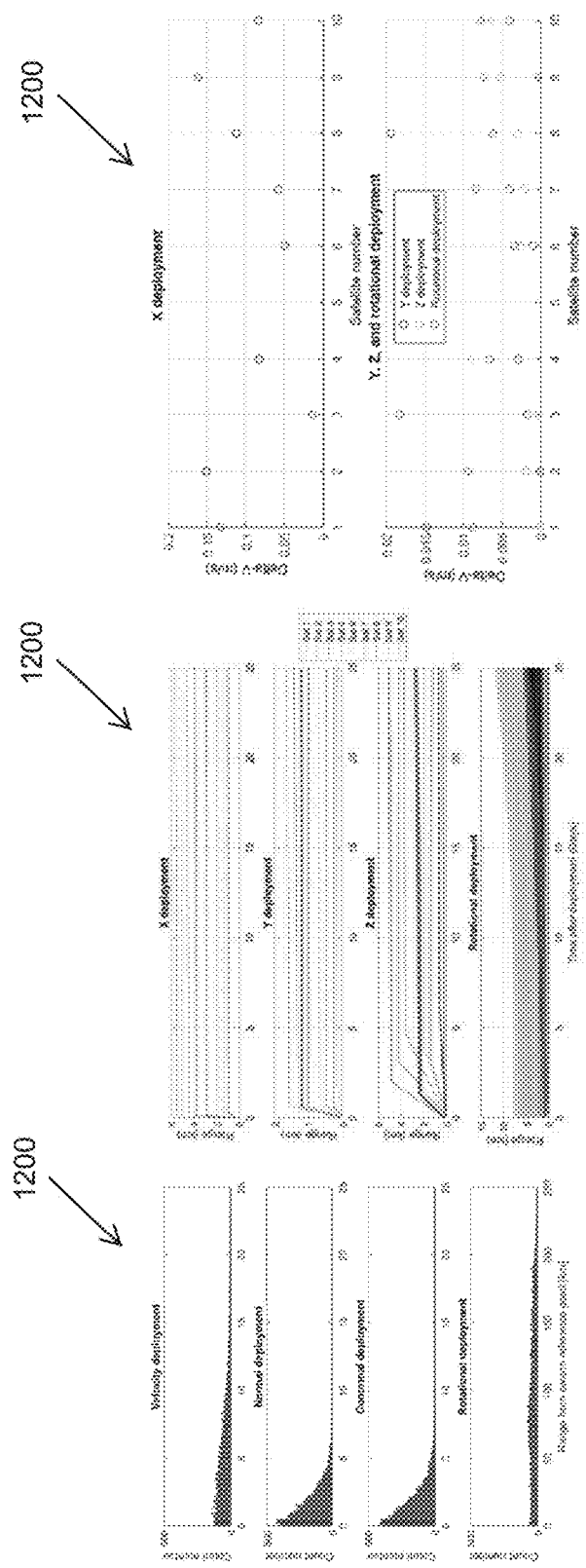
FIG. 12A
FIG. 12B
FIG. 12C
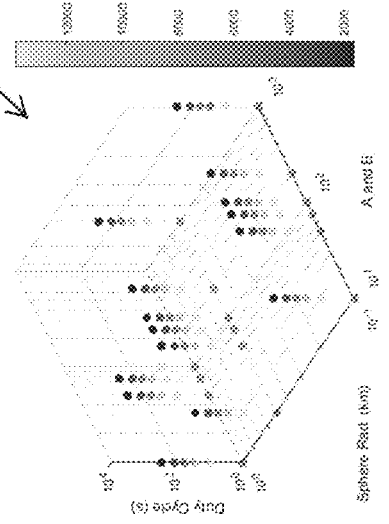
FIG. 12D
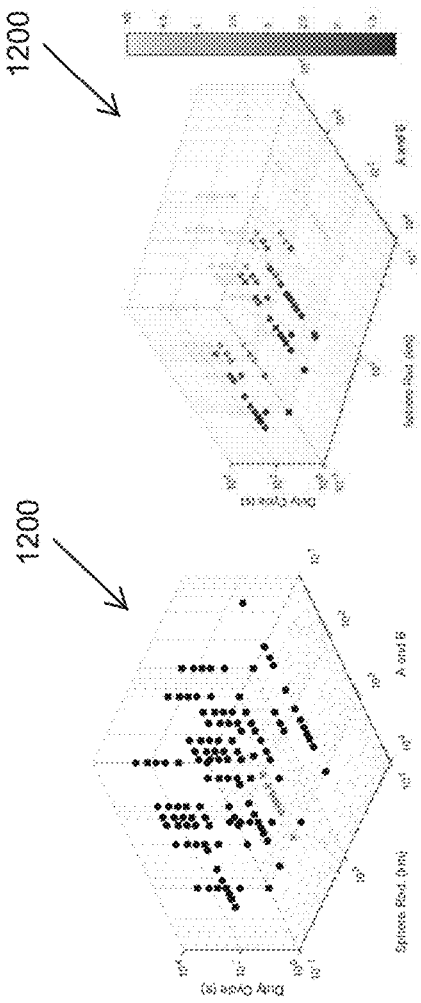
FIG. 12E
FIG. 12F

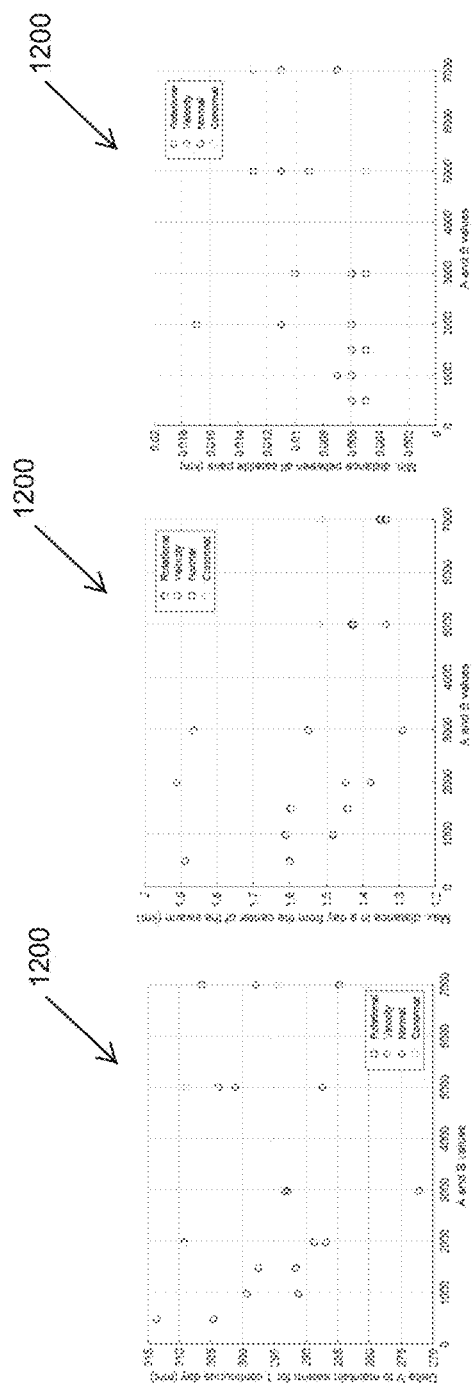
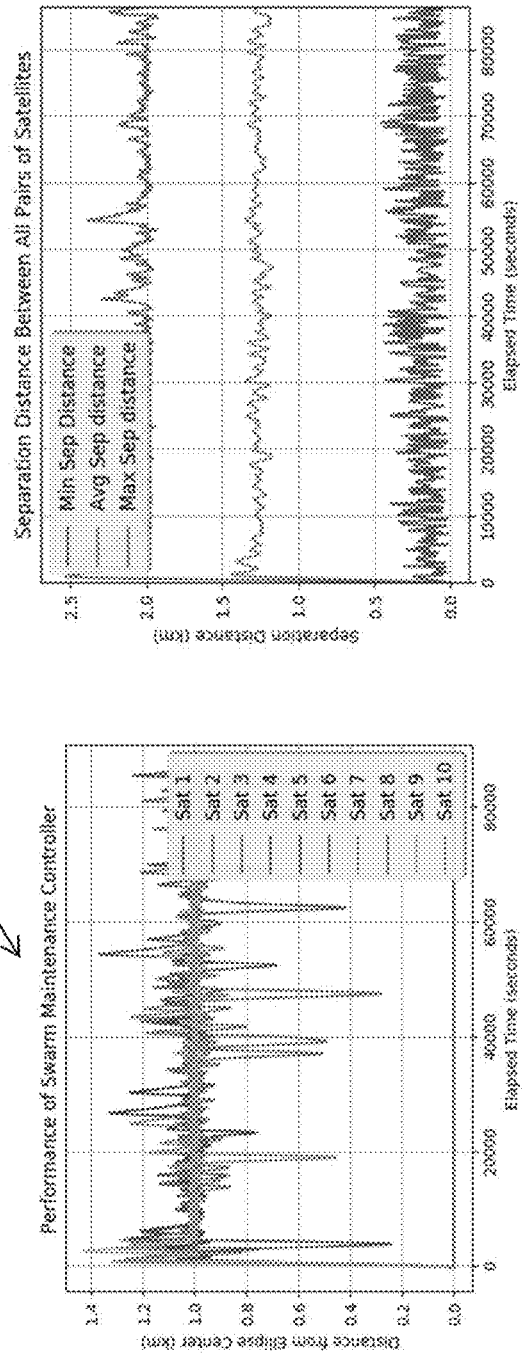
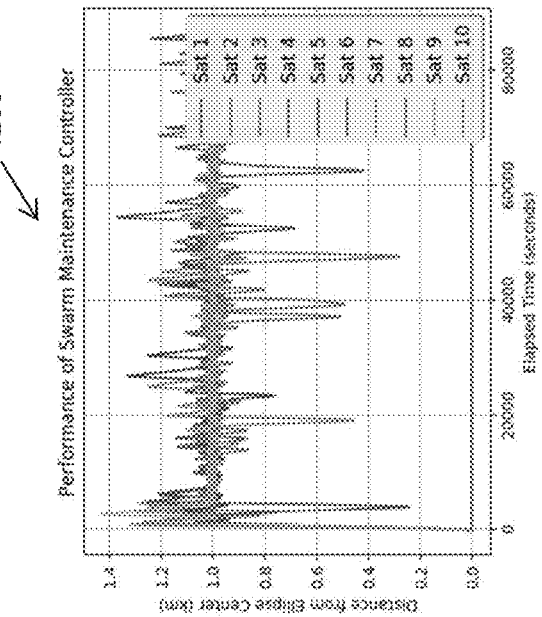
FIG. 12G  FIG. 12H  FIG. 12I
FIG. 12J
FIG. 12K

MODELLING AND ANALYZING INTER-SATELLITE RELATIVE MOTION

STATEMENT REGARDING FEDERALLY SPONSORED RESEARCH OR DEVELOPMENT

This invention was made with government support under grant No. NNA13AC87C awarded by NASA. The U.S. government has certain rights in the invention.

CROSS-REFERENCE TO RELATED APPLICATIONS

Not Applicable.

THE NAMES OF PARTIES TO A JOINT RESEARCH AGREEMENT

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to software that provides the orbital maneuvers required to achieve a desired type of inter-satellite relative motion, specifically software that models and analyzes inter-satellite relative motion from a 3D volume of space in dynamic orbitals.

Simultaneous measurements from a 3D volume of space are desired for a variety of Earth scientific studies and space exploration, e.g., LEO, GEO, cis-lunar, and deep space. One approach to collecting simultaneous measurements from a 3D volume of space is via a satellite swarm, consisting of tens, hundreds, or even thousands of satellites. A swarm is defined as multiple satellites flying in formation near one another or in close proximity, in approximately the same or similar orbits. For simultaneous measurements to ultimately be extended to different regions of space, e.g., deep space, some degree of local control for swarm applications is required. Satellite swarms constitute a challenge from an orbital mechanics standpoint. Traditional mission design involves the application of methodical processes where predefined maneuvers for an individual satellite are planned in advance. This approach does not scale to satellite swarms consisting of many satellites orbiting in close proximity; non-deterministic maneuvers cannot be preplanned due to the large number of units and the uncertainties associated with their differential deployment and orbital motion.

Current software for modeling and analyzing satellites does so for each satellite individually, for example, the most widely used tool for modeling and analyzing satellites is the general mission analysis tool (GMAT). While GMAT software can be configured to model and analyze each individual satellite in a swarm, the practicality of ground commanding each individual satellite in a swarm does not scale to very large swarms without becoming cost prohibitive, and inefficient. Thus, the swarm must be modeled and analyzed and ultimately operated as a unit, responding to high-level specifications for relative position and velocity.

One or more embodiments of the present invention enables the modeling and analysis of the relative motion of satellites in a swarm satellite mission. An embodiment of the present invention provides orbital maneuvers that can achieve relative swarm motion, in accordance with an objective or mission for the swarm. An embodiment of the present invention encompasses algorithms and orbital dynamics models that enable the desired relative motion of swarm satellites, including user specification of the properties of a swarm configuration. Given user-defined inputs, an embodiment of the present invention provides maneuver(s) to achieve the objective. For example, one embodiment of the present invention takes inputs of position and velocity data for a swarm of satellites, and outputs several products that enable autonomous control of a swarm to achieve a specified mode of relative motion. These products include prescribed changes in each satellites velocity vector and plots and animations that illustrate how prescribed velocity changes change the desired relative motion amongst the swarm.

In an embodiment, this tool provides a variety of visualization tools for satellites in the swarm. These visualization tools can be for ground controllers, for monitoring and identifying the relationship between a desired relative motion amongst the swarm, and the corresponding orbital parameters for each individual satellite. One or more embodiments use a variety of graphics and animations. After computing the optimal orbital maneuvers to modify the swarm, these results can be simulated to demonstrate successful swarm control.

BRIEF SUMMARY OF THE INVENTION

One embodiment of the present invention provides a method of modeling inter-satellite relative motion of more than one satellites. The method of modeling comprises the more than one satellites being configured. A geometry, alignment, and separation of the more than one satellites are specified. One or more manual or automated inputs are provided to the more than one satellites. The more than one satellites are deployed. Animations of the more than one satellites are provided that can be capable of displaying motions of the deployed more than one satellites. Data relating to the inter-satellite relative motion of the more than one satellites can be outputted. In one example, specifying a geometry, alignment, and separation of the more than one satellites further comprises factoring in gravitational perturbations. In another example, specifying a geometry, alignment, and separation of the more than one satellites further comprises factoring in atmospheric decay. In another example, specifying a geometry, alignment, and separation of the more than one satellites further comprises factoring in propulsion subsystems. In another example, specifying a geometry, alignment, and separation of more than one satellites further comprises factoring in ballistic coefficient. In another example, specifying a geometry, alignment, and separation of more than one satellites further comprises factoring in magnitude of deployment impulse. In another example, specifying a geometry, alignment, and separation of more than one satellites further comprises factoring in statistical frequency of outcomes. In another example, specifying a geometry, alignment, and separation of more than one satellites further comprises defining similar orbits for the more than one satellites.

In an embodiment, providing manual or automated inputs further comprises deploying commands to the more than one satellites.

In another embodiment, providing manual or automated inputs further comprises providing mathematical constructs capable of defining boundaries and keep-out regions.

In another embodiment, providing manual or automated inputs further comprises defining mathematical constructs capable of containing the more than one satellites within a pre-determined volumetric boundary.

In another embodiment, modeling inter-satellite relative motion of the more than one satellites further comprises defining mathematical constructs that are capable of commanding the swarm to achieve one or more modes of configuration.

In another embodiment, configuring the more than one satellites further comprises enabling the capability of cross-link communication between the more than one satellites.

In another embodiment, configuring the more than one satellites further comprises providing autonomous station-keeping on the more than one satellites.

In one or more embodiments, the modeling of inter-satellite relative motion of more than one satellites further comprises factoring in: low earth orbit, geosynchronous equatorial orbit, cislunar, deep space, Keplerian motion, conventional propulsion, low thrust, and differential drag.

Another embodiment provides a system of more than one satellites comprising a specified geometry, alignment, and separation for the more than one satellites relative to each other. The geometry, alignment, and separation enables the system of the more than one satellites to move relative to each other within artificial boundaries and keep-out regions. In an example, the system of the more than one satellites is an in-train distribution formation. In another example, the system of the more than one satellites is an ellipsoid volume container formation. In another example, the system of the more than one satellites is a projected circular orbit formation. In another example, the system of the more than one satellites is formation flying.

Another embodiment provides for a method of analyzing inter-satellite relative motion of more than one satellites. The method of modeling comprises the more than one satellites being configured. Parameters are specified for the more than one satellites. Inputs are provided to the more than one satellites. The more than one satellites are deployed. Animations of the more than one satellites are provided that can be capable of displaying motions of the deployed more than one satellites. In an example, specifying parameters for the more than one satellites further comprises defining a geometry, alignment, and separation of the more than one satellites. In another example, the specifying a geometry, alignment, and separation of more than one satellites further comprises configuring manual or automated inputs. In one or more examples, configuring the more than one satellites further comprises defining volumetric boundaries and keep-out regions. In another example configuring the more than one satellites further comprises defining similar orbits for the more than one satellites. In one or more examples, providing inputs to the more than one satellites further comprises inputting gravitational perturbations, atmospheric decay, propulsion subsystems, ballistic coefficient, magnitude, and frequency.

In an embodiment, defining volumetric boundaries and keep-out regions further comprises defining the volumetric boundaries using mathematical constructs.

In another embodiment, defining volumetric boundaries and keep-out regions further comprises defining an in-train volumetric boundary through deployment dispersion control.

In another embodiment, configuring the more than one satellites further comprises calculating how the more than one satellites need to maneuver to achieve an objective.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIGS. 12A-12K show outputs of the present invention that enable trade space study according to one embodiment of the present invention.

DETAILED DESCRIPTION OF THE INVENTION

Figure 1:
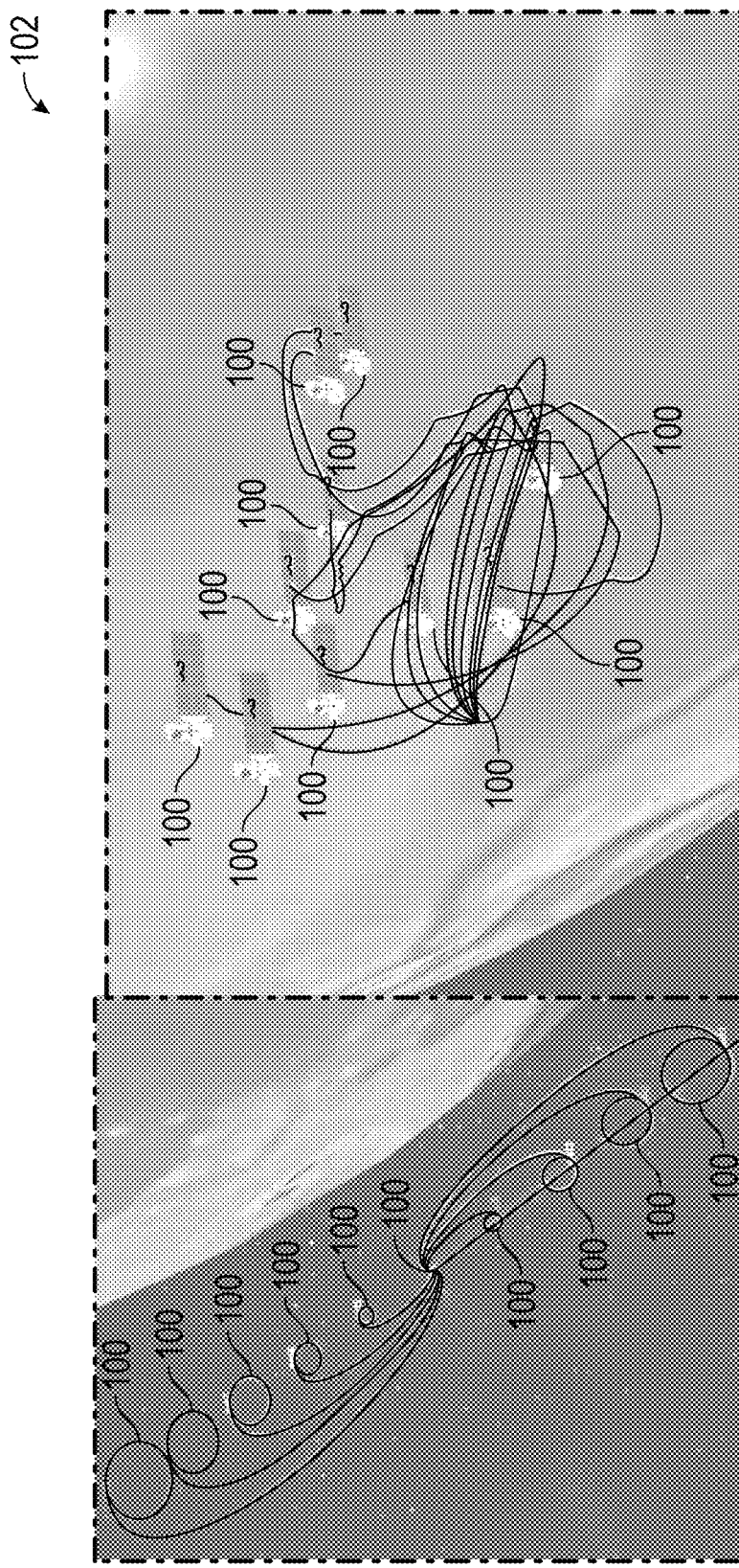
FIG. 1 shows exemplary output animations of distributions of satellites according to one embodiment of the present invention.

Simultaneous measurements from a 3D volume of space are useful for a variety of studies in space physics, Earth science, imagery objectives, and to achieve varied mission objectives among other fields of application. Swarm concepts with multiple satellites in close proximity have the capacity to achieve such objectives. Enabling unit modeling, analysis and ultimately control of swarms of large numbers of cooperating satellites introduces new space mission capabilities and complexities. The differences from conventional missions will be manifold, spanning science goals, instrument design, concept of operations, satellite capabilities, and inter-satellite cooperation.

Swarm missions can require maintaining an operator-specified geometry, alignment, or separation. According to one embodiment of the present invention, a user can input high-level configuration commands to configure the orbital maneuvers needed to achieve the desired type of swarm relative motion. Rather than conventional path planning, the present invention can employ mathematical constructs, e.g., artificial potential functions to define boundaries and keep-out regions for enabling and controlling satellite motion. The software architecture includes high-fidelity propagation, accommodates manual or automated inputs, displays motion animations, and returns maneuver commands and analytical results. The present invention has been enabled for two swarm types: in-train distribution and an ellipsoid volume container. However, additional swarm types, simulation applications, and orbital destinations are feasible using the methods employed by the present invention.

Practical implementation of satellite swarms relies on the precise control of relative distances and orientations between participating satellites. Researchers have considered various methods of achieving this by either finding orbits that together achieve a stable periodic relative motion, by utilizing a higher cost control effort to maintain formations in less ideal orbital environments, or a combination of the two. By allowing instruments on separate satellites to be combined into a co-observatory, formation flying can replace an expensive multiple payload platform with a large number of low-cost satellites. One possible application is interferometric synthetic aperture radar (InSAR) in which a standard circular relative orbit that has periodic out of plane motion can used to create higher fidelity radar observations from Low Earth Orbit. Another possible application include ground-based laser communications to a chief satellites that can be calibrated with the assistance of atmospheric probe lasers from deputy satellites to reduce power loss. Other application can include rapid stereographic imaging and other sparse antenna array applications.

In a preferred embodiment of the present invention, to model the individual satellite trajectories, the present invention employs GMAT, an open-source mission analysis tool developed by a team of NASA, private industry, public, and private contributors. Each time the present invention runs, user inputs define a custom GMAT script. While user creation of a simulation script in GMAT's GUI is possible, the present invention executes this automatically and avoids what could become a tedious task of configuring a swarm of a large number of satellites. Thus, the present invention calls the open-source propagator (GMAT) to advance the motion of the satellites for a specified time step, and then passes all state data to the custom Python function written for that swarm type. If delta-V maneuvers are desired for this epoch, the present invention implements them as impulsive burns. Fuel depletion modeling by the present invention reflects propulsion system parameters given by the user (Isp, max thrust magnitude, and duty cycle). The present invention then propagates forward another time step, leveraging an available high-fidelity model that includes perturbations due to atmospheric drag, solar radiation pressure, and J2 effects of the bulge of the Earth. At the next epoch, the calls back and forth to the Python function repeat. The entire propagation process continues for a specified duration of the simulation. The present invention outputs data of interest for each satellite, such as state vectors, fuel use, and maneuvers, to text files. Output files support subsequent scripts that generate final products. An embodiment of the present invention also displays an animation of the swarm motion.

The design of the present invention accommodates several options for the source of the user inputs: graphical user interface (GUI) for small analyses or developing customer awareness, text files for "hands-off" applications such as Monte Carlo analyses, and a defined software interface for future integration with higher- and lower-level users/controllers.

Mission descriptions can include initial and target conditions, the mission orbit, number of satellites and their characteristics, and simulation parameters. When a swarm mission begins, the member satellites have initial orbital conditions, either from ground estimates of existing on-orbit assets, or from a dedicated deployment phase of mission objectives. The core algorithms of the present invention receive state vectors for the swarm members uniformly for all input sources and simulates initial states resulting from a deployment impulse.

Defining target conditions for the swarm includes inputting the desired orbit and the desired swarm configuration. According to one embodiment of the present invention, multiple orbital and non-Keplerian regimes, and low Earth orbit (LEO) factors can be accommodated.

The present invention categorizes swarms by type. Examples of swarm types include but are not limited to in-train distribution, ellipsoid container, projected circular orbits, flying formation, ellipsoid with distribution. Users can choose the target swarm type, orientation, and dimensions. Analysis cases can further accommodate allowable magnitude of deployment impulse and statistical frequency of outcomes.

Embodiments of the present invention factor in orbital motion, including propulsion subsystem capabilities and ballistic coefficient. The accuracy of the models and analysis outputs of the present invention rely on accurate knowledge of swarm member positions and velocities. This includes factoring into the algorithm real-world communication and navigation. Furthermore, according to one embodiment of the present invention, users can input restrictions on state knowledge.

Figure 5:
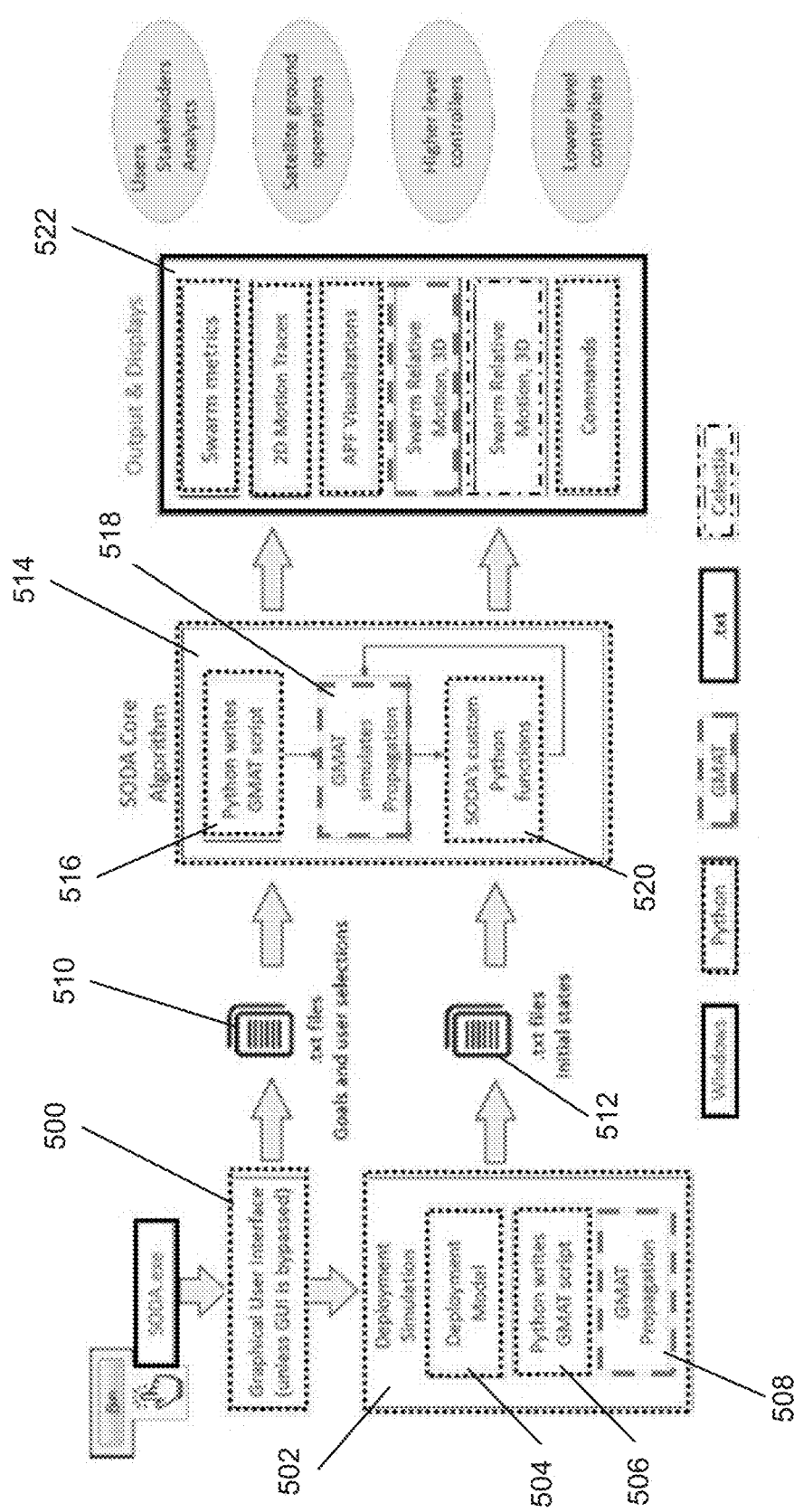
FIG. 5 shows the overall structure of the present invention according to one embodiment of the present invention.

FIG. 1 shows exemplary output animations 102 of distributions of satellites 100, namely, in-train distribution of satellites (left) and a ten-satellite swarm simulation relative to a central reference point (right). FIG. 5 illustrates the magnitude of the resulting relative motion will be a function of the in-train separation distances; satellites that maneuver further ahead or behind will have greater relative motion than those satellites closest to the point of reference. The present invention generates several outputs. As shown in FIG. 1, output capabilities can include 3D animations of the trajectories of the satellites 100 using GMAT such as a screen capture of the in-train distribution case and an ellipsoid container with 10 satellites 100. Impulsive burns can be recognizable as cusp points in the trajectory curves. Satellite images can default to a standard GMAT model, or can be configured to import custom designs. Counter-intuitive aspects for customers and multi-disciplinary collaborators can include the effects of differential drag in LEO which can be generally more pronounced than mission planners expect and can be a design driver on post-deployment altitude control. The present invention models how large a dispersion would be achieved in a given time, or how changes to deployment vectors affect the spreading of the satellites.

For visualization and analysis, the present invention contains a "free drift" swarm type where no corrective maneuvers are performed. Initial conditions can be propagated using the high-fidelity model. The usefulness of the free drift mode includes for studies comparing different swarm types, or for illustrating the underlying relative motion dynamics. One embodiment of the present invention captures and outputs metrics that characterize swarm performance by and for quantitative analysis. These free drift simulations emphasize the importance of considering the effects of swarm deployment design in the overall mission scenario. Rotational and velocity vector deployments will cause greater dispersion, requiring control cost early in the mission to ensure swarm containment. Conormal and normal deployments can be advantageous choices in that regard; however, even deployments in these directions will suffer from pointing inaccuracy and may also require some corrective maneuvers to counteract any deployment component in the velocity vector direction.

Figure 2:
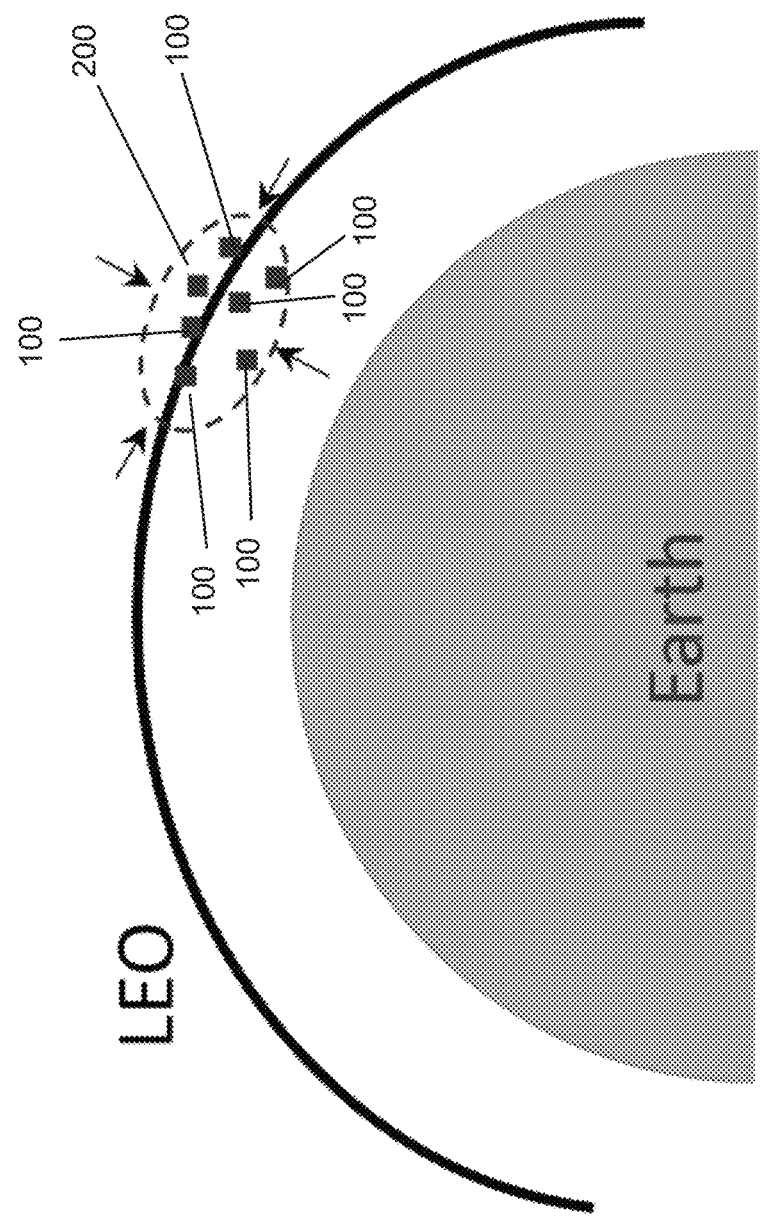
FIG. 2 shows an ellipsoidal swarm type in LEO according to one embodiment of the present invention.

FIG. 2 shows an ellipsoidal swarm type 200 in LEO. An ellipsoid container swarm type maneuvers satellites 100 within a defined ellipsoid, the center of which is on its own specified (mathematical) orbit. Within this volume, satellites 100 may wander, but not escape. To achieve an ellipsoid container swarm type, mathematical constructs, e.g., artificial potential functions (APFs) can be employed. APFs and/or other mathematical constructs can provide the maneuvers that guide satellites 100 to the ellipsoid volume, constrain their motion to within this volume, and prevent collisions. To accomplish simultaneous attraction and repulsion with APFs, the global potential function can be defined such that the negative gradient of the potential leads to the desired target area. For a method, e.g., the APF method, to be feasible for autonomous control, there is a non-trivial preference that each of satellites 100 has knowledge of the estimated states of all other satellites in the swarm at a given instant of query. The attractive potential function can be of the general form and the repulsive potential can be a function of the distances between each pair of satellites. An obstacle avoiding approach using a Gaussian function can be employed to achieve this. The global potential for satellites 100 is the sum of the attractive and repulsive potential functions.

In one embodiment of the present invention, a volume container swarm type takes the form of an ellipsoid boundary constraint on the satellites' motion. In this embodiment, the center of the ellipsoid can be defined via a state vector and has its own virtual orbit. Satellites can be prescribed maneuvers to remain inside this volume while avoiding collisions with other satellites.

Figure 3:
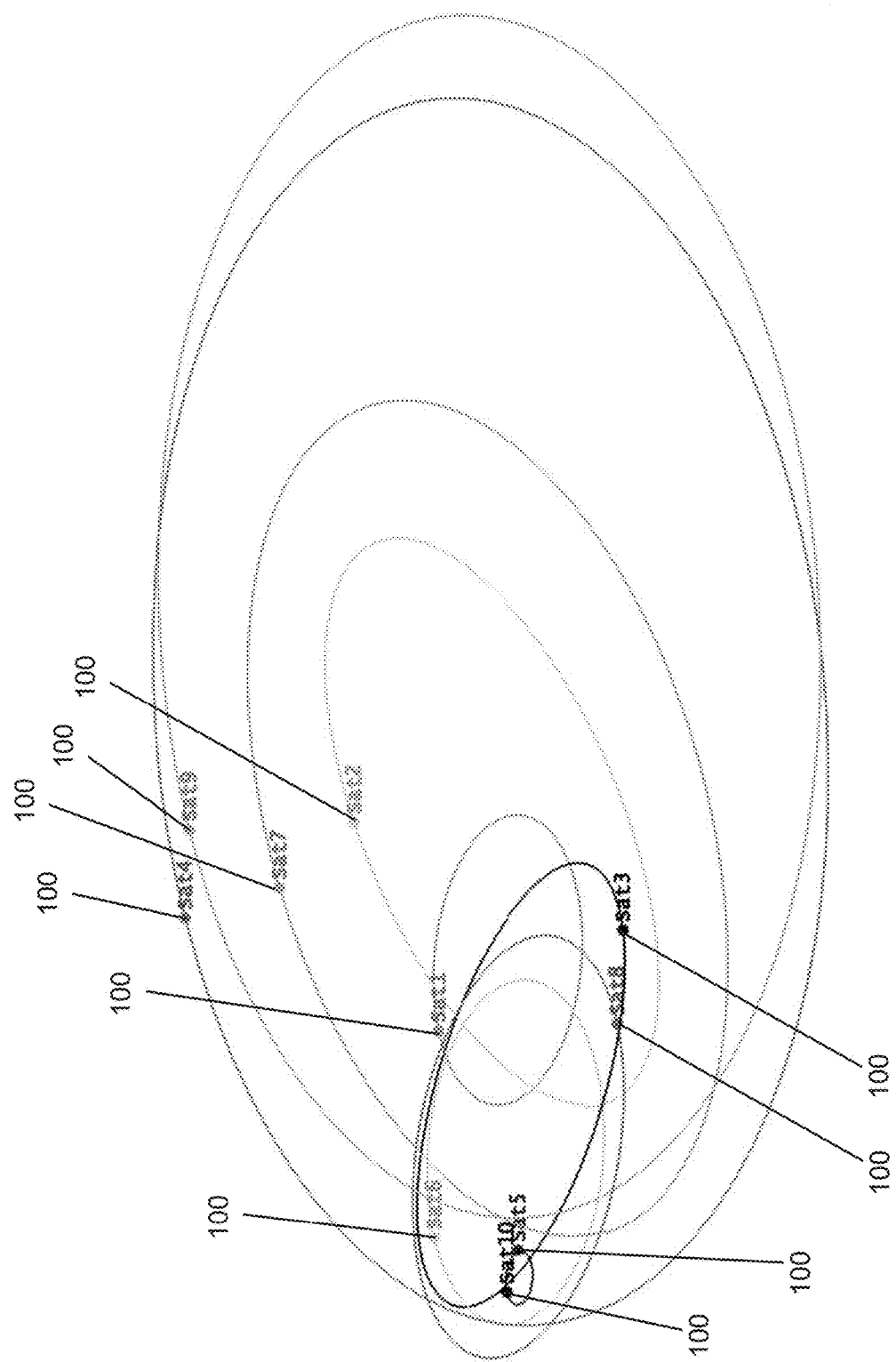
FIG. 3 shows exemplary satellite motion in orbits relative to a reference satellite according to one embodiment of the present invention.

FIG. 3 shows exemplary satellite 100 motion in orbits relative to a reference satellite. According to the embodiment of the present invention shown in FIG. 3, for analysis of flying formations, e.g., deployment dispersion control, the reference point of the swarm corresponds to satellite number 5, (equivalent to half of the total number of swarm members). However, the deployment dispersion control is robust and works with any satellite 100 or moving orbital point as a reference point. Satellite 100 motion can be relative to satellite 5, the reference point of the swarm. Stable and quasi-periodic trajectories are shown, resulting from rotational deployment and applied control maneuvers. Since perturbations introduced by the deployment are distinct every time that the simulation executes, each satellite will drift apart from the reference point at a different rate. Similarly, depending on the type of deployment, two other components, normal and co-normal, will determine the type of motion with respect to the reference point as well. Differences in these two components can imply larger periodic oscillations in the planes defined by these two directions, i.e., different relative orbit tracks with respect to the reference point. These tracks can have various relative inclinations and sizes as shown in FIG. 3. The initial maneuver to stop the drift over time and instead, to stay in a quasi-periodic track, can be timed to allow a safe inter-satellite range that satisfies particular mission requirements. As above, if the deployment vector is different for each of the satellites, they will drift at various rates. The mission design can determine then when to place a maneuver to get a quasi-periodic track with no risk of collision since the tracks can be at ranges of hundreds of meters or kilometers, depending on the mission concept. Therefore, each satellite can measure its drift rate from the reference point and perform a maneuver that cancels the differential deployment in the velocity component to stop the continuous drift and to instead stay at a particular variable range for several days, in the absence of differential drag.

Figure 4:
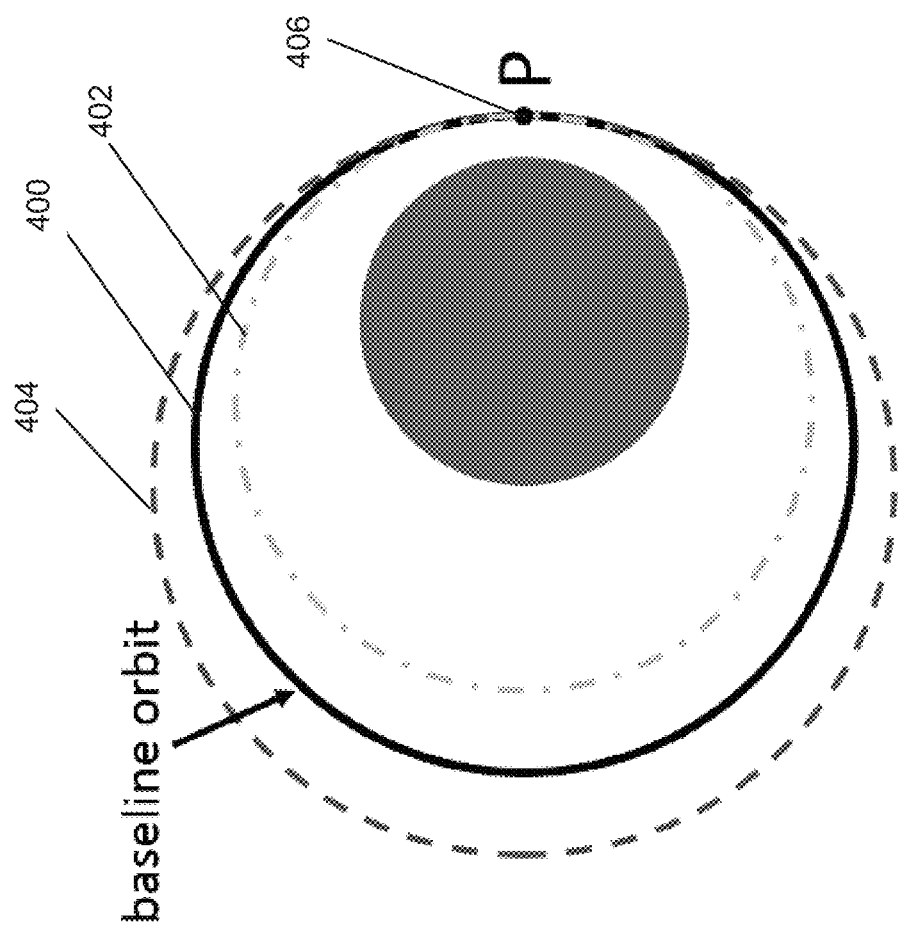
FIG. 4 shows a baseline orbit with two potential phasing orbits according to one embodiment of the present invention according to one embodiment of the present invention.

FIG. 4 shows a baseline orbit 400 with two potential phasing orbits 402 and 404 relative to a circular baseline where both delta-V maneuvers would occur at point P 406 according to an embodiment of the present invention. In an in-train distribution swarm type, the objective is to phase the satellites ahead and behind each other to achieve an in-track, or string-of-pearls, relative position configuration. The present invention maneuvers each satellite by performing a two-impulse elliptical transfer orbit from and back to the same orbit, e.g., a phasing maneuver. If the satellite's relative position is trailing the target position, then the phasing orbital period must be less than that of the current orbit. A retrofire can be employed; the satellites must slow down to speed up. The retrograde delta-V occurs at apoapsis of the phasing orbit. On the other hand, if the target is "behind" or trailing in the along-track direction, the phasing orbit must have an orbital period greater than that of the current orbit. A forward fire thruster can be employed to boost the satellite's velocity. The prograde delta-V occurs at periapsis of the phasing orbit. If the baseline orbit is not circular, then the resulting in-train formation will have relative motion in the radial and along-track directions. The residual relative motion is due to the speed of the satellites changing as they move around the elliptical orbit.

FIG. 5 shows the overall structure of an embodiment of the present invention. Note that the present invention's dependencies can be free and open-source, with the exception of the operating system, e.g., Windows. Dependencies employed in the present invention include: Python (with numpy, tkinter, and matplotlib libraries), GMAT, and Celestia.

GUI 500 prompts the user to specify initial and final conditions via GUI 500 interface. User specified inputs define the execution of the next steps: deployment simulation 502, deployment model 504, a first script write 506, and GMAT propagation 508. Initial state vectors (Keplerian or Cartesian) may be provided as a model of estimations for satellites already in orbit, or the user may elect for the present invention to simulate a swarm deployment from a specified orbit. Depending on the swarm type selected, the user will be prompted for specific parameters that define the swarm type. Alternatively, the user may bypass GUI 500 altogether and provide inputs via text files 510 and 512. From the user's inputs, the present invention's core algorithm 514 generates a custom script 516 to produce a high-fidelity simulation to be performed by GMAT 518. During the simulation, GMAT links to Python scripts 520 that have been specifically written for the present invention to enable the desired swarm types. After the simulation completes, the user receives outputs 522 in the form of animation, plots, and statistics. Employing the present invention, several swarm types of interest, e.g., in-train distribution, ellipsoid container, projected circular orbit, among a plethora of other flying formations, have been identified and configured into the system. An exemplary user may choose from one of the available formations, and algorithms configured in the present invention output models and analysis describing how to achieve and maintain the chosen configuration. The outputs of the present invention include tabular listings of maneuver magnitudes, plots, animations, and numerical metrics describing how well the swarm type was maintained in the simulation.

One embodiment of the present invention queries the states of all satellites 100 in the swarm at a user-specified frequency. An algorithm according to one embodiment of the present invention first checks a wait condition, verifying that enough time has elapsed since the last impulsive maneuver. For example, a particular satellite design may require a duty cycle of 30 seconds. If either the wait condition is unsatisfied or the time derivative of the potential is negative, no maneuvers are performed. Next, the embodiment of the present invention can calculate a scaling factor for the magnitude of the impulsive maneuver by defining the maximum possible change in V magnitude achievable by the satellite. Next, the desired relative velocity vector for satellite can be calculated. The relative velocity change can execute via an impulsive maneuver.

There are several parameters integral to the present invention that may be either tuned to constants or defined as time-varying functions. Choosing these parameters is a swarm design choice, as different values can yield very different maneuvers and thus impact fuel use and mission life.

Figure 6:
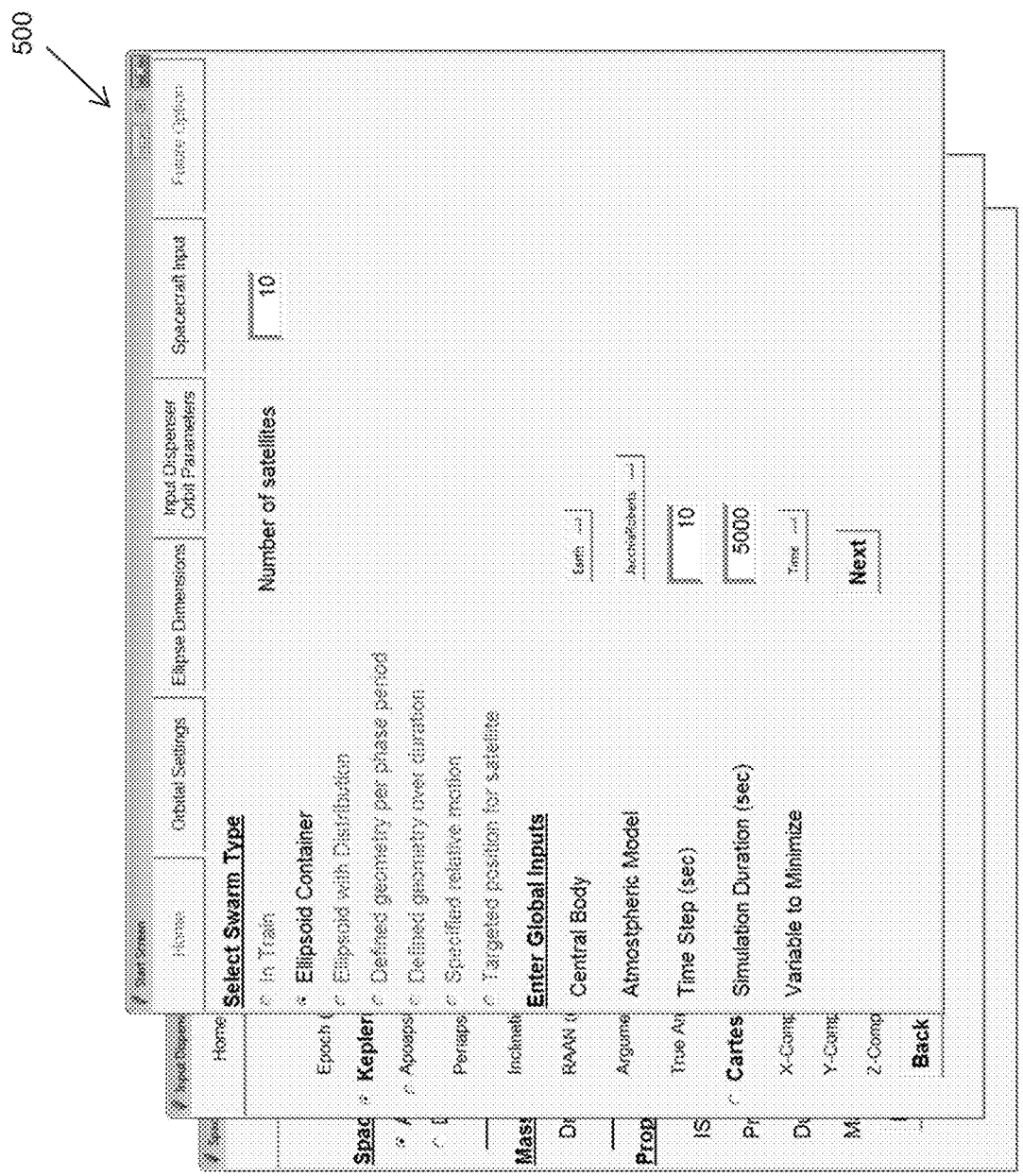
FIG. 6 shows an exemplary GUI interface according to an embodiment of the present invention according to one embodiment of the present invention.

FIG. 6 shows an exemplary GUI 500 interface according to an embodiment of the present invention. Unless it is bypassed via the command line, GUI 500 prompts the user for inputs required for use cases and dynamically generates files needed for subsequent modules of the program. Each window contains a category of inputs, with buttons and tabs to provide navigation through the screens (FIG. 6). As a user progresses through GUI 500, logical checks ensure valid inputs, such as realistic orbital elements. GUI 500 functionality concludes with the creation of prerequisite files needed for other programs in the application. Because of a Python version dependency in GMAT, the GUI 500 was written in Python version 3.4.3. An embodiment of the present invention can use the tkinter module that comes prepackaged with Python. GUI 500 consists of classes, including a parent class that initializes and stacks multiple components of GUI 500.

In the Windows command line the user can bypass GUI 500. In this embodiment, the present invention will look for all necessary parameters in user-provided text files. Executing the embodiment of the present invention via scripts enables Monte Carlo style analyses, and this feature is especially useful if the user needs to define unique initial states and propulsion system properties for tens or hundreds of satellites.

Figure 7:
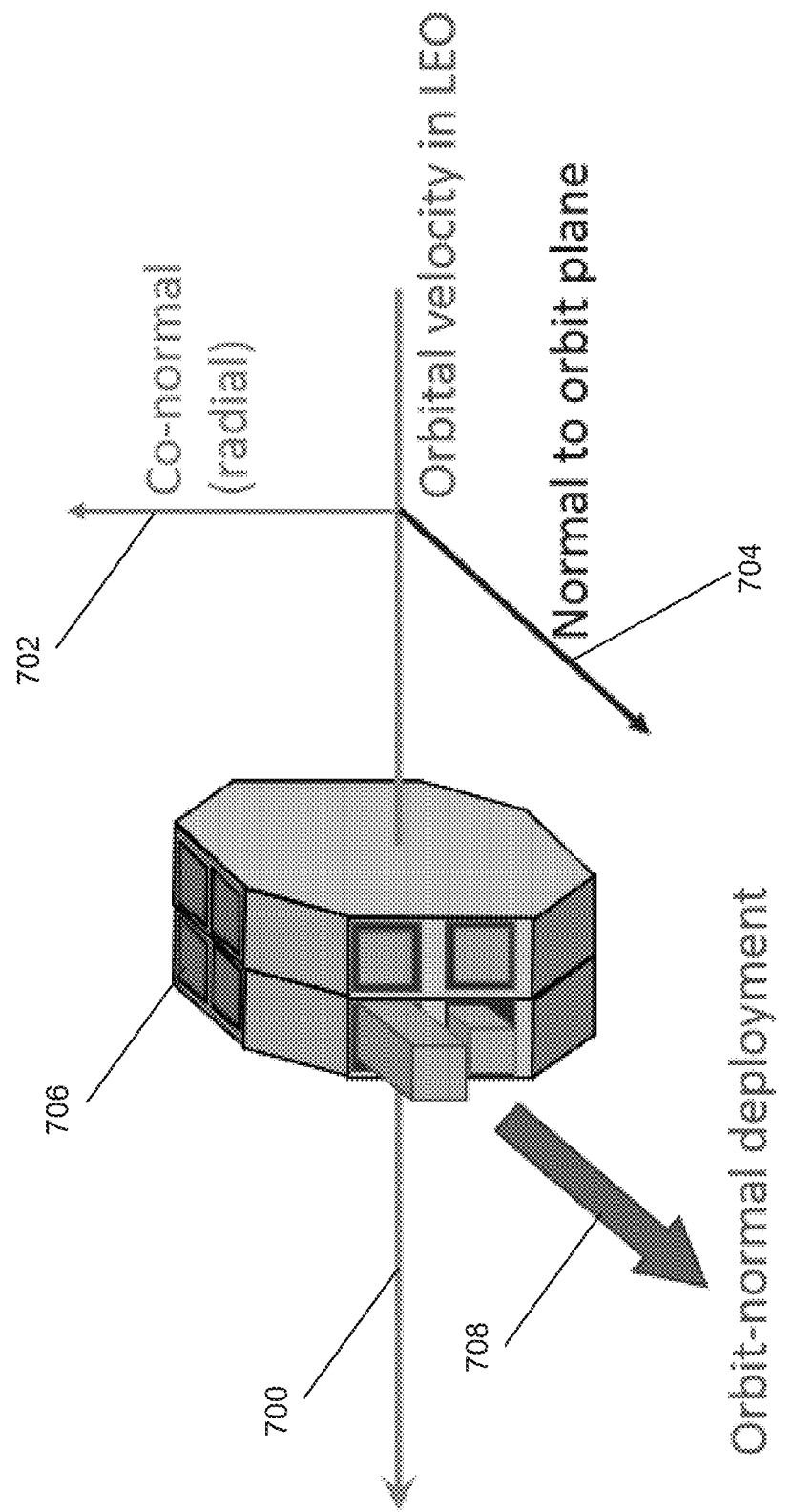
FIG. 7 shows a directional deployment in the normal axis of a velocity, normal, and co-normal coordinate frame according to one embodiment of the present invention.

FIG. 7 shows a directional deployment of a first individual satellite 706 in the normal axis 708 of a velocity 700, normal 704, and co-normal 702 coordinate frame according to one embodiment of the present invention. The velocity, normal, co-normal directional deployment simulation is for deployments along one of the three axes of the deploying vehicle's velocity 700, normal 704, and co-normal 702 directional deployment reference frame. For the deployment simulations shown in FIG. 7 and in FIG. 8 described below, the orbit of the dispenser was specified by the user. A user specified delay was activated between individual deployments. To simulate the imperfect nature of small satellite deployments, small random errors create a distribution for the deployment spring force. Individual deployment vectors also have pointing errors.

Figure 8:
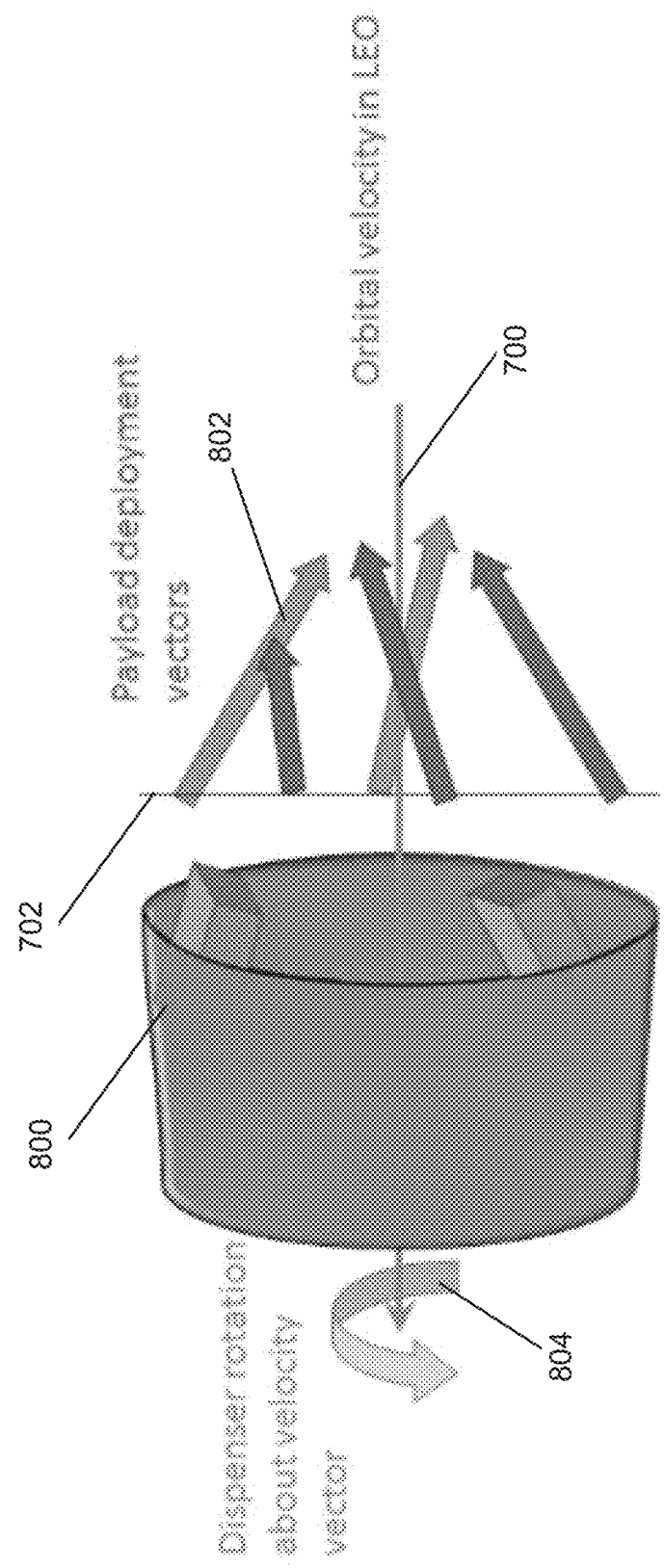
FIG. 8 shows a rotational deployment in the velocity or co-normal direction according to one embodiment of the present invention.

FIG. 8 shows a rotational deployment on velocity 700 axis and co-normal 702 axis according to one embodiment of the present invention. Velocity 700 can be the directional axis on which rotation is present. Dispenser rotation is about velocity vector 804. The rotating deployment simulation models CubeSat deployments from rotating vehicle 800. Deployment vectors 802 includes components from the spring force and a tangential component due to the dispenser's rotation.

According to one embodiment of the present invention, deployment dispersion control preferably requires few and small maneuvers. For certain scenarios, even a single initial adjustment maneuver will suffice, e.g., short duration missions when no differential drag is involved. The differences in the deployment vectors cause the satellites to drift apart from one another. In a velocity, normal, co-normal directional deployment reference frame, the factor that contributes most to the swarm drift is the component of the deployment vector that is aligned with the orbital velocity. The deployment dispersion control consists of a maneuver to cancel out the difference in the velocity component between the reference point of the swarm and each of the members. The maneuver that accomplishes the cancellation can occur along the orbital velocity vector. Accurate and timely knowledge of the deployment vectors could enable the implementation of the algorithm by just cancelling the velocity component in the velocity, normal, co-normal directional deployment reference frame. However, the required precision for the measurement of the spring force and attitude control of the deployer may not be achievable with current satellite operations and technology. The deployment dispersion control method depends then on the shared knowledge of the state vectors among satellites, so the computer on board each satellite can negate the differences in semimajor axis between it and the considered reference point.

Figure 9A:
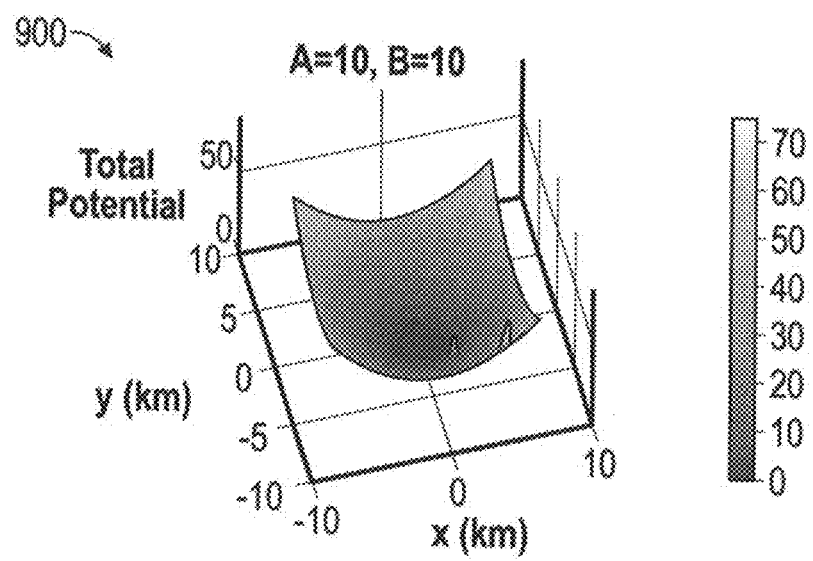
FIGS. 9A-9C show three examples of unique choices for the artificial potential function (APF) parameters according to one embodiment of the present invention.
Figure 9B:
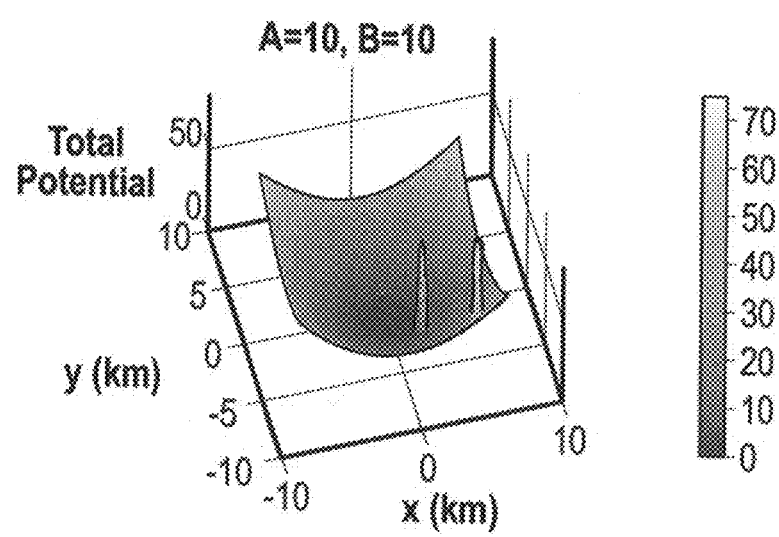
Figure 9C:
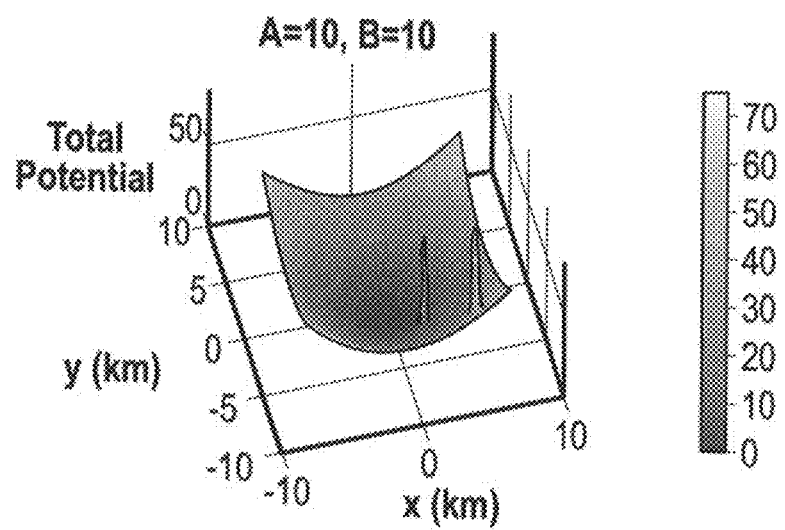

FIGS. 9A-9C shows three exemplar graphical representations 900 of unique choices for the APF parameters and illustrates how the total potential field can be represented for different values of these APF parameters according to one embodiment of the present invention. FIG. 9 illustrates the generic mathematical concept of APF parameters and is not an output of the present invention. According to one embodiment of the present invention, a wider base and steeper curve for the repulsive function creates a more conservative "keep out" zone, however this may unnecessarily cause more maneuvers as the satellites move within the ellipsoid volume. Monte Carlo analysis can be an option for choosing the optimal values of parameters for a specific mission concept.

Figure 10:
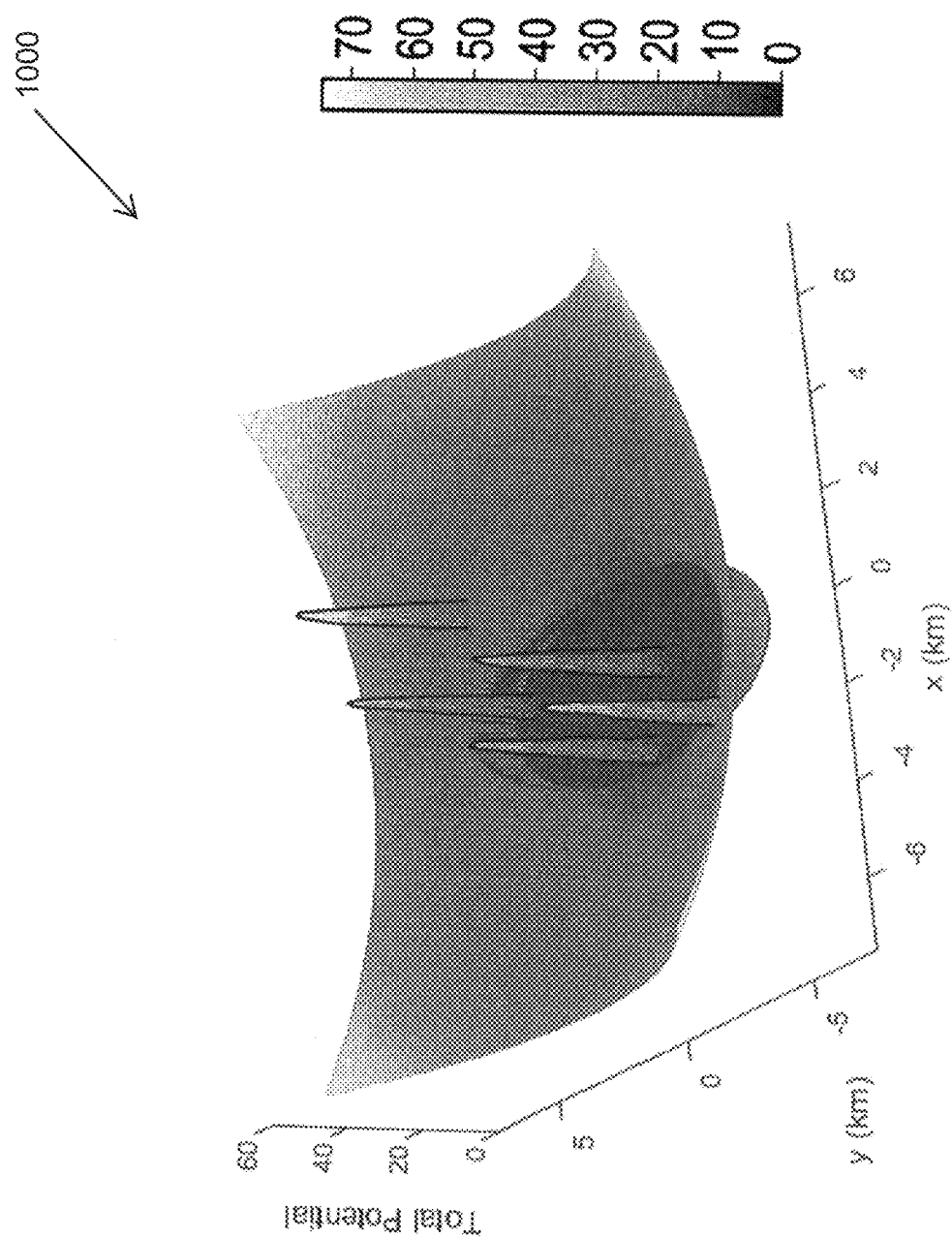
FIG. 10 shows an APF field for a five satellite swarm in an equatorial, circular LEO according to one embodiment of the present invention.

FIG. 10 shows a graphical depiction of an APF field for a five-satellite swarm in an equatorial, circular LEO 1000 according to one embodiment of the present invention as might be calculated by the present invention at the start of a simulation. FIG. 10 illustrates the generic mathematical concept of APF parameters and is not an output of the present invention.

Figures 11A, 11B:
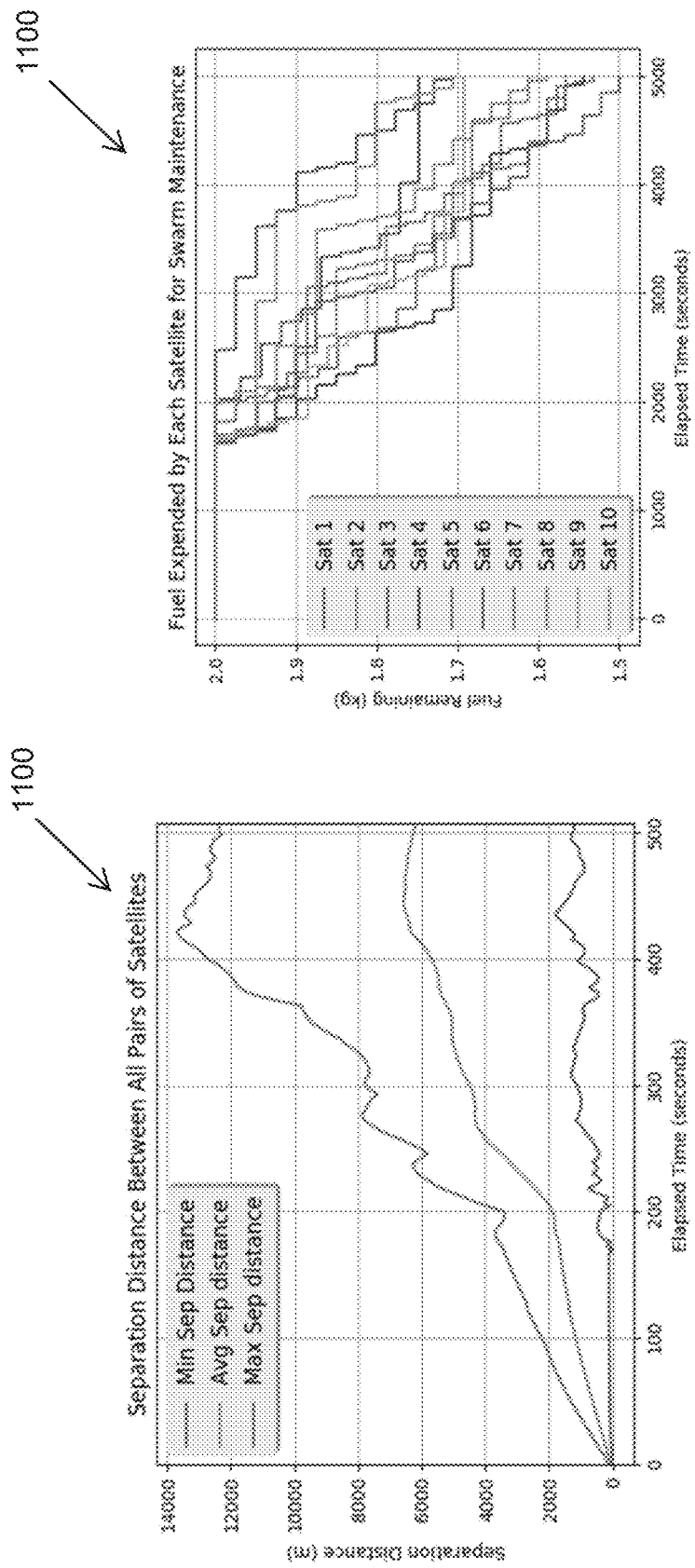
FIGS. 11A-11B show performance metrics outputs of the present invention according to one embodiment of the present invention.

FIGS. 11A-11B shows performance metrics outputs 1100 of one embodiment of the present invention, namely, on the left is an example study of a collision avoidance feature of APFs. FIG. 11A (left) demonstrates that the overall average separation distance grows after deployment, however there can also be instances where a pair of satellites come within about 15 meters of each other. Close approach information allows an exemplary user to study and tune the repulsive functions of the APFs. The embodiment can be capable of factoring in specifications required for given missions, e.g., the keep-out zones around one or more satellites, fuel use, and other relevant factors. FIG. 11B (right) shows that one satellite used ½ kg of fuel over the duration of an exemplary simulation. Visualizations of the time varying APFs allow a user to study different swarm design choices and how they would impact performance. An embodiment of the present invention can additionally output tabular output files representing maneuver commands for swarm maintenance (not shown).

FIGS. 12A-12K show outputs of the present invention 1200 that enable trade space study. FIGS. 12A-12K show outputs producible by the present invention including but not limited to ranges from a swarm reference point as a function of deployment type (FIG. 12A), an exemplary approach for controlling drift range oscillation of a swarm of satellites (FIG. 12B); outputs of an exemplary delta-V cost per satellite for each exemplary deployment scenario, e.g., x deployment and y-z rotational deployment (FIG. 12C); outputs of simulations of rotational deployment that identifies cases that met success criteria in light shading relative to the darker shading which did not meet success criteria (FIG. 12D); outputs of maximum excursion results of any satellite from the swarm center by gradient (FIG. 12E); outputs of parametric study rotational deployments with maximum separations (FIG. 12F); outputs of delta-V totals for swarm maintenance based on parametric studies (FIG. 12G); outputs maximum distances of any satellite from a volume container center (FIG. 12H); outputs of minimum intersatellite distances, indicating how close the satellites come to collision (FIG. 12I); results from a successful configuration of 10 exemplary satellites (FIG. 12J); outputs describing the maximum separation distance between satellites (FIG. 12K).

According to one additional embodiment of the present invention, swarms can be enabled to have capabilities for cross-link communication and station-keeping.

According to one embodiment of the present invention, the satellite swarm achieves and maintains a specified geometry, alignment, and/or separation.

According to one embodiment of the present invention, an exemplary user inputs high level commands and constraints and a response to said high level commands and constraints in outputted. From a single high-level command, the present invention can be capable of determining required individual satellite maneuvers over time, thereby assisting ground personnel with designing and commanding the placement of the swarm members. The present invention achieves this maneuver calculations by applying the most appropriate algorithm to achieve the desired swarm mode, which can be a basic Hohmann transfer or a more complex, nonlinear control routine.

According to one embodiment of the present invention, the present invention enables an exemplary user to control inter-satellite relative motion to achieve the objectives of the swarm as a whole by providing orbital maneuvers required to achieve a desired type of relative swarm motion.

In one embodiment of the present invention, orbit maintenance and swarm maintenance may be combined as drivers on control algorithms, however, to isolate swarm maintenance, it may be preferable to identify target orbital motion that includes gravitational perturbations and atmospheric decay. One approach for accommodating realistic target motion can be to define a pseudo-satellite whose trajectory will be a reference point for the swarm.

In an embodiment of the present invention, methods of optimal formation trajectory planning can involve but are not limited to such methodologies as linear programming, primer vector theory, Hohmann transfers, Lambert's solution, and the application of Gauss' variation of parameters. A general method employed in the art is to develop a set of optimal reference trajectories for a formation and then to use a linear quadratic regulator (LQR) tracking method to control to each path. Alternatively, the desire to maintain any formation in a more demanding dynamic environment has led to the generation of a myriad of control methodologies applied to satellite formation configuration.

In one embodiment of the present invention, exemplary satellites in the satellite swarm can be the same. However, the exemplary satellites can also be different. Specialized elements, e.g., different satellites in the swarm, will be part of future implementations of the present invention.

In one embodiment, the present invention can accommodate several CubeSat options, from 1U to 6U. Attitude control capabilities can be employed to mitigate differential drag among swarm members in LEO.

In an embodiment, the present invention provides outputs relating to a useful approximation of differential drag effects with an option to apply random drag areas from Gaussian distribution with user settings for mean and standard deviation.

According to one embodiment of the present invention, a swarm controller could become a component of ground support and could leverage the central advantage of the approach of the present invention by streamlining operations of a large number of swarm members using input commands abstracted for the swarm as a single entity.

According to another embodiment of the present invention, interfaces to other mission components can be provided that use maneuver commands, such as control software or analytical simulations.

In alternate embodiments of the present invention, additional swarm types can include: statistical distribution, short-hold geometric formation, periodic geometric formation, and specified relative motion.

In an embodiment of the present invention, mission design, although accurate measurement data and successful orbit determination algorithms can be assumed, the algorithmic requirements, e.g., of position and velocity, can be mission-specific. Deep space swarm missions can rely on alternate orbit determination methods using radio- or optical-based measurements. Analysis of orbital estimation requirements for satellite swarms can be modeled using the present invention.

According to an embodiment of the present invention, regimes of development could include, but are not limited to: LEO, GEO, cislunar, deep space, conventional propulsion, low thrust, differential drag, and the present invention requiring no control authority.

In another embodiment of the present invention, the methods and systems of the present invention disclosed herein can provide a method of controlling inter-satellite relative motion of more than one satellites, and/or the methods and systems of the present invention disclosed herein can provide a system of controlled inter-satellite relative motion of more than one satellites. This can include but is not limited to: configuring more than one satellites; specifying geometry, alignment, and separation of the more than one satellites; providing one or more manual or automated inputs to the more than one satellites; deploying the more than one satellites; providing animations of the more than one satellites that can be capable of displaying motions of the deployed more than one satellites; outputting data relating to the inter-satellite relative motion of the more than one satellites; factoring in gravitational perturbations, atmospheric decay, propulsion subsystems, ballistic coefficient, magnitude of deployment impulse, statistical frequency of outcomes, and defining similar orbits for the more than one satellites; deploying commands to said more than one satellites; providing mathematical constructs capable of defining boundaries and keep-out regions; defining mathematical constructs capable of containing the more than one satellites within a pre-determined volumetric boundary; defining mathematical constructs that are capable of commanding the swarm to achieve one or more modes of configuration; enabling the capability of crosslink communication between the more than one satellites; providing autonomous station-keeping on the more than one satellites; factoring in: low earth orbit, geosynchronous equatorial orbit, cislunar, deep space, Keplerian motion, conventional propulsion, low thrust, differential drag, or other relevant factors in spacecraft flight dynamics for a given environment; and calculating how the more than one satellites need to maneuver to achieve an objective. The exemplary system can be controlled to move relative to each other within a specified geometry, alignment, and separation; in addition, artificial boundaries and keep-out regions can be defined or provided to the system; such boundaries and regions can provide an in-train distribution formation, ellipsoid volume formation, projected circular orbit formation, formation flying, or any other suitable formation as would be capable of achieving an objective.

In one embodiment of the present invention, the goal may be to not avoid dispersion entirely, since some separation may be required to avoid risk of collision. Thus, swarm deployment and controller design becomes an exercise in simultaneously containing the satellites, but preventing collision.

In one embodiment of the present invention, the methods are carried out on a computer that has been appropriately programmed.

In at least one embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, Python, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed processor, e.g., a microprocessor, computing cloud, Application Specific Integrated Circuit (ASIC), Field Programmable Gate Array (FPGA), or the like, in conjunction with appropriate memory, network, and bus elements.

INDUSTRIAL APPLICABILITY

The invention is further illustrated by the following non-limiting examples.

Example 1

Satellite swarms, as multiple satellites orbiting together, can enable novel science and technology missions. In this example, satellite swarms were defined as a formation of cooperative satellites in which the state of each satellite depends on the state of the other members in the formation. The scope of this example was limited to swarms in low-Earth orbit (LEO). The intrinsic configuration of swarms in space faced major challenges related to the maintenance of their spatial disposition. Typically, each satellite in the swarm needed to perform maneuvers to keep the overall configuration, as well as to minimize the probability of collision. Since each satellite was in a distinct position and velocity state with respect to every other, differential motion acts as a threat to maintaining the swarm formation. In addition, for LEO swarm mission design there were practical constraints of implementation and operations such as that the swarm configuration need not persist throughout the mission duration or for the entire orbit lifetime of the satellites.

In an embodiment, swarm maintenance may be of relatively short timespan for collecting data into onboard storage. In this embodiment, the remaining mission duration can address downlinking data in relatively brief contacts typically available from LEO. Atmospheric drag can cause natural decay for the mission to meet disposal requirements within 25 years or sooner. After swarm maintenance ends, further data collection with less stringent temporal and spatial coordination can be an option for certain mission concepts.

The present invention simulated and analyzed satellites operating and maneuvering per a high level relative motion constraint. The present invention simulated the dispersal of the deployed satellites to account for different orbit insertions that presented a challenge to swarm maintenance. The simulation included practical initial conditions, such as realistic deployment models, errors in the deployment vector, and delays between the deployment of each satellite.

The present invention's control and maneuver strategies were assessed in the context of currently available CubeSat propulsion systems. Two approaches for controlling the relative motion of a swarm were employed for autonomous small sat swarms in LEO. The first method involved modified miniature phasing maneuvers, where maneuvers can be prescribed that canceled the differential delta-V of each CubeSat's deployment vector. The second method relied on artificial potential functions (APFs) to contain the satellites within a volumetric boundary and avoid collisions.

The first approach consisted of small maneuvers that keep each satellite in a quasi-periodic range with respect to a reference point. This approach sought to cancel out the main component of each satellite's deployment velocity vector via maneuvers that can be considered as miniature, modified phasing maneuvers. From these simulation results, propulsion systems were identified that would be suitable for implementation of this control scheme on CubeSats.

The second method explored a method to achieve a random distribution of the satellites by defining a controller based on artificial potential functions (APFs). In this approach, satellites were contained within an ellipsoid volume constraint via an attractive potential, while repulsive potentials were assigned to each satellite to avoid collisions. Using position and velocity state information for all satellites in the swarm, maneuvers were calculated as a function of the time-varying APFs. To assess this method, parametric studies were completed for the selection of: volume container size, duty cycle of the impulsive maneuvers, maximum allowable delta-V per maneuver, and the shape of repulsive function.

Performance results indicated that each method has advantages and drawbacks for particular applications. For example, mini phasing maneuvers can be more predictable and sustainable. While the APF approach provided a more responsive and distributed performance, there was considerable propellant cost. The first approach was determined to be most mission-feasible, while the modified APF method of required too much control authority to be enabled by current propulsion systems.

Further embodiments and methods are disclosed in the publications Conn, Tracie et al., "Operating Small Sat Swarms as a Single Entity: Introducing SODA", NASA Ames Research Center, SSC17-V-06, 31$^{st}$ Annual AIAA/USU Conference on Small Satellites, Logan, Utah, Aug. 7-10, 2017; and Dono, Andres et al., "Propulsion Trade Studies for Spacecraft Swarm Mission Design", NASA Ames Research Center, 2018 IEEE Aerospace Conference Proceedings, Mar. 3-10, 2018 which are both hereby incorporated by reference.

Example 2

NASA's decadal survey determined that simultaneous measurements from a 3D volume of space are advantageous for a variety of studies in space physics and Earth science. Therefore, swarm concepts with multiple spacecraft in close proximity are a growing topic of interest in the small satellite community. Among the capabilities needed for swarm missions is a means to maintain operator-specified geometry, alignment, or separation. Swarm stationkeeping poses a planning challenge due to the limited scalability of ground resources. To address scalable control of orbital dynamics, Swarm Orbital Dynamics Advisor (SODA) is a tool that accepts high-level configuration commands and provides the orbital maneuvers needed to achieve the desired type of swarm relative motion. Rather than conventional path planning, SODA's innovation is the use of artificial potential functions to define boundaries and keepout regions. The software architecture includes high fidelity propagation, accommodates manual or automated inputs, displays motion animations, and returns maneuver commands and analytical results. Currently, two swarm types are enabled: in-train distribution and an ellipsoid volume container. Additional swarm types, simulation applications, and orbital destinations are in planning stages.

Nomenclature

| | |
|---|---|
| $\bar{x}_i$ | 3 × 1 position vector of satellite i in the inertial reference frame |
| $\bar{x}_t$ | 3 × 1 position vector of target location in the inertial reference frame |
| $\bar{r}_i$ | 3 × 1 position vector of satellite i in the LVLH frame |
| $\bar{\rho}j,i$ | 3 × 1 position vector of satellite j with respect to satellite i, i.e. $\bar{x}_j - \bar{x}_i$ |
| $\phi$ | Potential function, scalar-valued |
| a, r | Subscripts on $\phi$ denoting attractive or repulsive potential functions |
| $\kappa$ | Selectable scaling factor for the magnitude of the impulsive maneuver |
| P | 3 × 3 positive-definite matrix that describes the shape of the attractive potential |
| A, B | Scalars that may be tuned to yield desired repulsive potential functions |
| APF | Artificial potential function |

SODA

In 2016, the Space Studies Board of the National Academies of Sciences, Engineering, and Medicine states that satellite swarm missions are of high priority for multiple disciplines and deserve focused investment and development. As defined by the Board, a swarm comprises multiple satellites flying in formation near one another in similar orbits. More specifically, we envision swarms to have capabilities for cross-link communication and station-keeping. Of particular interest to the scientific community is the ability of a satellite swarm to achieve and maintain a specified geometry, alignment, or separation.

Embodiments are described for how to control inter-satellite relative motion to achieve the objectives of the swarm as a whole. SODA, Swarm Orbital Dynamics Advisor, is a tool that provides the orbital maneuvers required to achieve a desired type of relative swarm motion. SODA is under development in the Mission Design Division at NASA Ames Research Center to enable new science return possibilities for future spacecraft swarm mission architectures.

Swarms of large numbers of cooperating satellites will introduce new space mission capabilities and complexities. The differences from conventional missions will be manifold, spanning science goals, instrument design, concept of operations, spacecraft capabilities, and intersatellite cooperation. From a mission operations perspective, swarms pose a planning challenge due to the limited scalability of ground operations. The approach of planning and commanding individual satellites simply does not scale for multi-sat swarms of tens or hundreds. If the current state-of-practice continues to be applied, operation of large swarms (e.g., 100 spacecraft or more) will become intractable and cost prohibitive.

To avoid this operations bottleneck, a new approach is required: the swarm must operate as a unit, responding to high level commands and constraints. SODA enables high level user inputs in a single planning cycle. From one high level command, SODA determines all of the required individual satellite maneuvers over time, relieving ground personnel of the tasks of designing and commanding the placement of the swarm members. SODA accomplishes this by applying the most appropriate algorithm, which can be a basic Hohmann transfer or a more complex, nonlinear control routine.

Prior formation flying studies used guidance and control algorithms for very particular mission concepts, such as assigning individual spacecraft to a target location and guiding each to its destination via artificial potential functions or explicit solutions to Lambert's problem. While SODA builds upon these concepts, the goal of the tool is somewhat more general. We have identified several swarm types that are particularly interesting in terms of science data return; subsequent sections provide details. A user may choose from one of the available types, and the algorithms in SODA handle how to achieve and maintain the chosen configuration. The resulting products include tabular listings of required Δv maneuvers, plots, animations, and numerical metrics describing how well the swarm type was maintained in the simulation.

SODA is early in its development and its current state emphasizes interactive use. Subsequent sections describe each of the components of SODA in detail; the high level design of SODA is as follows. First, the tool prompts the user to specify initial and final conditions via a GUI interface. Initial state vectors (Keplerian or Cartesian) may be provided as a model of estimations for spacecraft already in orbit, or the user may elect for SODA to simulate a swarm deployment from a specified orbit. Depending on the swarm type selected, the user will be prompted for the specific parameters that define that swarm type. Alternatively, the user may bypass the GUI altogether and provide inputs via text files. From the user's inputs, SODA generates a custom script to produce a high-fidelity simulation to be performed by the General Mission Analysis Tool (GMAT). During the simulation, GMAT links to Python scripts that have been specifically written for SODA to enable the desired swarm types. After the simulation completes, the user receives results in the form of animation, plots, and statistics. Note that SODA's dependencies are completely free and open-source, with the exception of the Windows operating system itself. These dependencies include: Python (with numpy, tkinter, and matplotlib libraries), GMAT, and Celestia. Our long-term goal is to implement several more swarm types in SODA and, ultimately, to make the tool available open-source.

Specifying the Swarm Mission

SODA's architecture design accommodates several options for the source of inputs: graphical user interface (GUI) for small analyses or developing stakeholder awareness, text files for "hands-off" applications such as Monte Carlo analyses, and a defined software interface for future integration with higher and lower-level controllers.

Mission descriptions include initial and target conditions, the mission orbit, number of spacecraft and their characteristics, and simulation parameters. This section summarizes the mission design inputs and implementation details appear in following sections.

When a swarm mission begins, the member spacecraft will have initial orbital conditions, either from ground estimates of existing on-orbit assets, or from a dedicated deployment phase of mission ops. SODA's core algorithms receive state vectors for the swarm members uniformly for all input sources and a powerful feature for users is the ability to simulate initial states resulting from the deployment impulse.

The target conditions for the swarm entail descriptions of the desired orbit and the desired swarm configuration. While SODA's planned development encompasses multiple orbital and non-Keplerian regimes, Low Earth Orbit (LEO) serves as a valuable, stressing case for the tool and is commonly used for small sat missions. Early test cases have revealed an important subtlety in specifying the target orbit in LEO: the use of orbital elements excludes perturbation effects. Orbit maintenance and swarm maintenance may be combined as drivers on SODA's control algorithms, however to isolate the swarm maintenance approach under study, it is necessary to identify target orbital motion that includes gravitational perturbations and atmospheric decay. One approach for accommodating realistic target motion is to define a pseudo-satellite whose trajectory will be a reference point for the swarm.

SODA categorizes swarms by type, with "In Train" and "Ellipsoid Container" discussed below. Examples of additional planned types include "Ellipsoid with Distribution," and some commonly referenced formations. Users choose the target swarm type, orientation, and dimensions. Maneuvers are constrained to allowable magnitude and frequency.

The spacecraft participating in the SODA swarm are currently all identical. Specialized swarm elements will be part of future implementations. Specifications of most relevance to orbital motion are propulsion subsystem capabilities and ballistic coefficient. SODA currently offers users several CubeSat options, from 1U to 6U. Attitude control capabilities are very important for mitigating differential drag among swarm members in LEO. While SODA is not a mission simulator with high fidelity attitude models, it does offer a useful approximation of differential drag effects with an option to apply random drag areas from Gaussian distribution with user settings for mean and standard deviation.

SODA's calculations rely on accurate knowledge of swarm member positions and velocities. For the first release, the model excludes issues of real-world communication and navigation. Future versions will allow users to input restrictions on state knowledge.

Using the SODA GUI

Unless it is bypassed via the command line, the SODA GUI is the first part of SODA application. The GUI prompts the user for inputs required for SODA's use cases and dynamically generates files needed for subsequent modules of the program. Each window contains a category of inputs, with buttons and tabs to provide navigation through the screens. As a user progresses through the GUI, logical checks ensure valid inputs, such as realistic orbital elements. GUI functionality concludes with the creation of prerequisite files needed for other programs in the SODA application.

Because of a Python version dependency in GMAT, SODA's GUI is written in Python version 3.4.3. We use the tkinter module that comes prepackaged with Python. The GUI consists of classes, including a parent class that initializes and stacks multiple components of the GUI.

SODA's early development has followed a rapid prototyping approach, with requirements readily defined, prioritized and implemented. Functionality benefits from early user feedback. Future efforts will continue to ensure that the code structure is flexible, expandable, and manageable.

Bypassing the SODA GUI

In the Windows command line the user can bypass the GUI and SODA will look for all necessary parameters in user-provided text files. Executing SODA via scripts enables Monte Carlo style analyses, a feature that is especially useful if the user needs to define unique initial states and propulsion system properties for tens or hundreds of satellites.

Deployment Simulators

Rather than specifying the initial state of each individual satellite, a user may rely on SODA to perform a simulation of a small satellite deployment. Currently, two deployment simulators are available in SODA. We describe them as "VNC Directional" (velocity, normal, co-normal) and "Rotating."

For both deployment simulations, the orbit of the dispenser is specified by the user. There is a five second delay between the individual deployments. To simulate the imperfect nature of small satellite deployments, random errors of up to 10% create a distribution for the deployment spring force. The VNC Directional deployer simulation is for deployments along one of the three axes of the deploying vehicle's VNC reference frame. Individual deployment vectors have pointing errors of up to 0.5°. The Rotating deployer simulation models CubeSat deployments from a rotating vehicle. The deployment vector includes components from the spring force and a tangential component due to the dispenser's rotation.

Propagation Via GMAT

To model the individual spacecraft trajectories, we rely on GMAT, an open-source mission analysis tool developed by a team of NASA, private industry, public, and private contributors.[4] Each time SODA runs, user inputs define a custom GMAT script. User creation of a simulation script in GMAT's GUI is also possible, but SODA takes care of this automatically and avoids what could become a tedious task to configure a swarm of a large number of satellites. GMAT propagates the motion of the satellites for the specified time step, and then passes all state data to the custom Python function written for that swarm type. If $\Delta v$ maneuvers are required for this epoch, GMAT implements them as impulsive burns. Fuel depletion modeling by GMAT reflects propulsion system parameters given by the user ($I_{sp}$, max thrust magnitude, and duty cycle). GMAT then propagates forward another time step, using a high fidelity model that includes perturbations due to atmospheric drag, solar radiation pressure, and J2 effects. At the next epoch, the calls back and forth to the Python function repeat. The entire propagation process continues for the specified duration of the simulation. GMAT outputs data of interest for each satellite, such as state vectors, fuel use, and maneuvers, to text files. Output files support subsequent scripts that generate final products. GMAT also displays an animation of the swarm motion.

Swarm Types

Missions have unique requirements for science data return, and swarm types will support different science objectives. To support swarm mission design, SODA currently has two swarm types enabled, each with its own control logic. Additional swarm types are in development.

Swarm Type: In-Train Distribution

In this swarm type, the objective is to phase the satellites ahead and behind each other to achieve an in-track, or string-of-pearls, relative position configuration. SODA maneuvers each satellite by performing a two-impulse elliptical transfer orbit from and back to the same orbit, known as a phasing maneuver.

If the spacecraft's relative position is trailing the target position, then the phasing orbital period must be less than that of the current orbit. A retrofire is required; the spacecraft must slow down to speed up. The retrograde $\Delta v$ occurs at apoapsis of the phasing orbit. On the other hand, if the target is "behind" or trailing in the along-track direction, the phasing orbit must have an orbital period greater than that of the current orbit. A forward fire thruster is required to boost the spacecraft's velocity. The prograde $\Delta v$ occurs at periapsis of the phasing orbit. We illustrate two possible phasing orbits relative to a circular baseline in FIG. 4, where both $\Delta v$ maneuvers would occur at point P.

If the baseline orbit is not circular, then the resulting in-train formation will have relative motion in the radial and along-track directions. The residual relative motion is due to the speed of the satellites changing as they move around the elliptical orbit. The magnitude of the resulting relative motion will be a function of the in-train separation distances; satellites that maneuver further ahead or behind will have greater relative motion than those spacecraft closest to the point of reference.

Swarm Type: Ellipsoid Container

The purpose of the ellipsoid container swarm type is to maneuver the satellites to within a defined ellipsoid, the center of which is on its own specified (mathematical) orbit, shown conceptually in FIG. 2. Within this volume, the satellites may wander, but not escape.

The parameters a, b, and c specify the dimensions of the ellipsoid container, as in:

$$\frac{x^2}{a^2} + \frac{y^2}{b^2} + \frac{z^2}{c^2} = 1 \tag{1}$$

where a, b, and c define the ellipsoid dimensions in the x-, y-, and z-axis directions of the local-vertical, local-horizontal frame with origin at the center of the ellipsoid container. In other words, for a local frame with its origin on the user-specified orbit, a would be the dimension in the radial direction, c would be the dimension in the orbit normal direction, and y would be in the direction of the unit vector that completes the triad.

For the ellipsoid container swarm type, we rely on artificial potential functions (APFs), a method for autonomous spacecraft control receiving extensive study in the past two decades. APFs provide the maneuvers that guide the spacecraft to the ellipsoid volume, constrain their motion to within this volume, and prevent collisions. To accomplish simultaneous attraction and repulsion, we define the global potential function such that the negative gradient of the potential leads to the desired target area.

For the APF method described in this section to be feasible for autonomous control, there is a non-trivial requirement that each satellite has knowledge of the estimated states of all other spacecraft in the swarm at a given instant of query. The relative position of each satellite in the swarm is simply:

$$\bar{r}_i = \bar{x}_i - \bar{x}_t \tag{2}$$

where $\bar{x}_i$ is the position vector of satellite i and $\bar{x}_t$ is the position vector of the ellipsoid center in the inertial reference frame. We define the general form of the attractive potential function for satellite i to be:

$$\phi_{a,i} = \frac{1}{2} \bar{r}_i^T P \bar{r}_i \tag{3}$$

where $\phi_{a,i}$ is scalar-valued. Taking the time derivative Equation (3) gives:

$$\dot{\phi}_{a,i} = \frac{1}{2} \bar{r}_i^T (P \bar{r}_i)^T \dot{\bar{r}}_i \tag{4}$$

Because the purpose of this swarm type is to constrain the satellites within the ellipsoid volume, we define:

$$\phi_{a,i} = \dot{\phi}_{a,i} = 0 \tag{5}$$

if satellite i is within the ellipsoid perimeter.

The repulsive potential is a function of the distances between each pair of satellites. We apply the obstacle-avoiding approach described by McQuade and McInnes and use a Gaussian function. For a swarm of n satellites, we define the total repulsive potential function for satellite i to be:

$$\phi_{r,i} = \Sigma_{j=1}^{n, j \neq i} A e^{B(\bar{\rho}_{j,i}^T P \bar{\rho}_{j,i})}. \tag{6}$$

where $\bar{\rho}_{j,i}$ is the position of satellite j with respect to satellite i. Taking the time derivative of Equation (6) gives:

$$\dot{\phi}_{r,i} = \Sigma_{j=1}^{n,j\neq i} -4AB(\bar{\rho}_{j,i}{}^T P\dot{\bar{\rho}}_{j,i})e^{B(\bar{\rho}_{j,i}{}^T P\bar{\rho}_{j,i})} \quad (7)$$

The global potential for spacecraft i is the sum of the attractive and repulsive potential functions:

$$\phi_i = \phi_{a,i} + \phi_{r,i} \quad (8)$$

SODA queries the states of all satellites in the swarm at a user-specified frequency. The algorithm first checks a wait condition, verifying that enough time has elapsed since the last impulsive maneuver. For example, a particular spacecraft design may require a duty cycle of 30 seconds. If either the wait condition is unsatisfied or the time derivative of the potential is negative, no maneuvers are performed.

If the wait condition is satisfied and $\dot{\phi}_i \geq 0$, the gradient for spacecraft i is found as:

$$\nabla\phi = \nabla\phi_{a,i} + \nabla\phi_{r,i} \quad (9)$$

$$\nabla\phi = P\bar{r}_i \Sigma_{j=1}^{n,j\neq i} -2AB P\bar{\rho}_{j,i} e^{-B(\bar{\rho}_{j,i}{}^T P\bar{\rho}_{j,i})} \quad (10)$$

The next step calculates a scaling factor for the magnitude of the impulsive maneuver:

$$\kappa = v_{max,i}(1-e^{-\lambda\phi_i}) \quad (11)$$

where $\lambda$ is a constant and $v_{max,i}$ is the maximum possible $\Delta v$ magnitude achievable by the satellite. Next, the desired relative velocity vector for satellite i is calculated:

$$\dot{r}_i = -\kappa \frac{\nabla\phi}{|\nabla\phi|} \quad (12)$$

Finally, the relative velocity change given by Equation (12) executes via an impulsive maneuver.

There are several parameters in the above equations that may be either tuned to constants or defined as timevarying functions: A, B, $\lambda$, and P. Choosing these parameters is a swarm design choice, as different values can yield very different maneuvers and thus impact fuel use and mission life. For example, FIGS. 9A, 9B, and 9C illustrate how the total potential field is represented for different values of A and B.

A wider base and steeper curve for the repulsive function creates a more conservative "keep out" zone, but may unnecessarily cause more maneuvers as the satellites move within the ellipsoid volume. Monte Carlo analysis is an option for choosing the optimal values of A, B, $\lambda$ and P for a specific mission concept. Currently SODA defaults to: A=B=50, $\lambda$=1, and P=[I]$_{3\times3}$. In FIG. 10, we illustrate a representative APF calculated by SODA at the start of a simulation.

Products and Results

SODA creates output products which serve its uses as a development environment for algorithms to control swarm orbital dynamics, simulation support for swarm technologies, and enhancing stakeholder awareness of swarm mission concepts and issues.

Among the most powerful display capabilities are 3D animations of the trajectories of the satellites using GMAT; a screen capture of the In-Train Distribution case and an Ellipsoid Container example with 10 satellites are shown in FIG. 1. Impulsive burns are recognizable as the cusp points in the trajectory curves. At present, the spacecraft image defaults to a standard GMAT model; pending capability will import custom designs.

Several aspects of on orbit relative motion may seem counter-intuitive for stakeholders and multi-disciplinary collaborators. For example, the effects of differential drag in LEO are generally more pronounced than mission planners expect and can be a design driver on post-deployment attitude control. It is beneficial to see how large a dispersion would be achieved in a given time, or how changes to deployment vectors affect the spreading of the satellites. For supporting stakeholder awareness, SODA has a "free drift" swarm type where no corrective maneuvers are performed; initial conditions are propagated only using the high fidelity model. We find that the free drift mode is useful mainly for studies comparing different swarm types, or to illustrate the underlying relative motion dynamics.

Design analyses and trades studies rely on quantitative evaluations and SODA captures metrics to characterize swarm performance. The plot on the left in FIG. 11A is an example study of the collision avoidance feature of the artificial potential functions. We see that the average separation distance grows after deployment, but there are instances where a pair of satellites come within 15 meters of each other in this particular case. Close approach information allows us to study and tune the repulsive functions of the APFs. We realize that in certain missions, the "keep-out" zones around satellites should be much more conservative than in other cases. An additional concern is fuel use. The plot on the right side of FIG. 11B shows that one satellite used ½ kg of fuel over the duration of this simulation. We would expect that more conservative repulsive APFs, as well as smaller ellipsoid dimensions, would require higher fuel use. Visualizations of the time varying APFs allow a user to study different swarm design choices and how they would impact performance.

Lastly, SODA generates tabular output files representing maneuver commands for swarm maintenance. Advanced evolution of a swarm controller could become a component of ground support and would leverage the central advantage of SODA's approach by streamlining operations of a large number of swarm members using input commands abstracted for the swarm as a single entity. Closer on the development timeline are interfaces to other mission components that use the maneuver commands, such as control software or analytical simulations.

Orbit Determination

We acknowledge that swarm maintenance requires knowledge of the relative position and velocity of each satellite i.e. the orbital parameters of each swarm agent. Up to this point, we have made the assumption of accurate state information. In the context of swarms, this is admittedly a big assumption.

The theory of orbit determination is as old as satellites themselves; the orbit of Sputnik was determined from Doppler shift measurements. In today's mission design, accurate measurement data and successful orbit determination algorithms are assumed. For example, the recent Radio Aurora eXplorer II (RAX-2) CubeSat mission reported a maximum GPS-derived error of 4.02 m for position and 0.48 m/s for velocity. This may or may not be sufficient accuracy for swarm satellites, and the requirements will be mission-specific. Deep space swarm missions beyond the help of GPS will rely on alternate orbit determination methods using radio- or optical-based measurements. Analysis of orbital estimation requirements for satellite swarms has been beyond the scope of this initial description, but imperfect measurements will be modeled in future SODA versions.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A computer-implemented method for modeling inter-satellite relative motion of more than one satellite members in a swarm in a model comprising:
configuring, by a processor, the more than one satellite members in the swarm by:
receiving an input at a satellite modeling and analyzing tool of initial and final conditions for the satellite swarm, wherein the initial conditions include initial state vectors for the satellite swarm members, and wherein the final conditions include a particular orbit and a particular swarm configuration of the more than one satellite members in the swarm;
receiving an input at the satellite modeling and analyzing tool of a swarm type selection;
receiving inputs at the satellite modeling and analyzing tool of one or more parameters for defining said swarm type; and
based on the inputs, generating by the satellite modeling and analyzing tool one or more instructions as inputs to the more than one satellite members in the swarm, and producing a high-fidelity simulation of the more than one satellite members in the satellite swarm;
running, by the processor, the simulation based on the one or more instructions, wherein the simulation links one or more scripts that enable the desired swarm types;
after the simulation completes, outputting, by the processor, data relating to said inter-satellite relative motion of the more than one satellite members in the swarm, including one or more of animation, plots, and statistics, wherein the outputted data is used by the satellite modeling and analyzing tool to generate one or more optimal orbital maneuver instructions to modify the swarm.

2. The method of claim 1, wherein the one or more parameters defining said swarm type include orientation and dimensions.

3. The method of claim 1, wherein the swarm type includes at least in train and ellipsoid container swarm types.

4. The method of claim 2, wherein the dimensions of the ellipsoid container swarm type is specified by parameters a, b, and c, wherein:

$$\frac{x^2}{a^2} + \frac{y^2}{b^2} + \frac{z^2}{c^2} = 1,$$

where a, b, and c define ellipsoid dimensions in the x-, y-, and z-axis directions of a local-vertical frame and a local-horizontal frame with origin at center of the ellipsoid container.

5. The method of claim 3, wherein one or more artificial potential functions provide one or more maneuvers that guide one or more spacecraft to the ellipsoid container volume, constrain the one more spacecraft to the ellipsoid container volume, and prevent collisions.

6. The method of claim 3, wherein a global potential function is used to accomplish simultaneous attraction and repulsion in the one or more satellite members of the swarm.

7. A system for modeling inter-satellite relative motion of more than one satellite members in a swarm, said system comprising: one or more processors; and a computer-readable medium carrying one or more sequences of instructions, which when executed by said one or more processors implement a method for modeling inter-satellite relative motion of more than one satellite members in a swarm in a model, said method comprising:
configuring, by a processor, the more than one satellite members in the swarm by:
receiving an input at a satellite modeling and analyzing tool of initial and final conditions for the satellite swarm, wherein the initial conditions include initial state vectors for the satellite swarm members, and wherein the final conditions include a particular orbit and a particular swarm configuration of the more than one satellite members in the swarm;
receiving an input at the satellite modeling and analyzing tool of a swarm type selection;
receiving inputs at the satellite modeling and analyzing tool of one or more parameters for defining said swarm type; and
based on the inputs, generating by the satellite modeling and analyzing tool one or more instructions as inputs to the more than one satellite members in the swarm, and producing a high-fidelity simulation of the more than one satellite members in the satellite swarm;
running, by the processor, the simulation based on the one or more instructions, wherein the simulation links one or more scripts that enable the desired swarm types;
after the simulation completes, outputting, by the processor, data relating to said inter-satellite relative motion of the more than one satellite members in the swarm, including one or more of animation, plots, and statistics, wherein the outputted data is used by the satellite modeling and analyzing tool to generate one or more optimal orbital maneuver instructions to modify the swarm.

8. The system of claim 7, wherein the one or more parameters defining said swarm type include orientation and dimensions.

9. The system of claim 7, wherein the swarm type includes at least in train and ellipsoid container swarm types.

10. The system of claim 9, wherein the dimensions of the ellipsoid container swarm type is specified by parameters a, b, and c, wherein:

$$\frac{x^2}{a^2} + \frac{y^2}{b^2} + \frac{z^2}{c^2} = 1,$$

where a, b, and c define ellipsoid dimensions in the x-, y-, and z-axis directions of a local-vertical frame and a local-horizontal frame with origin at center of the ellipsoid container.

11. The system of claim 9, wherein one or more artificial potential functions provide one or more maneuvers that guide one or more spacecraft to the ellipsoid container volume, constrain the one more spacecraft to the ellipsoid container volume, and prevent collisions.

12. The system of claim 9, wherein a global potential function is used to accomplish simultaneous attraction and repulsion in the one or more satellite members of the swarm.

* * * * *